(12) United States Patent
Chen et al.

(10) Patent No.: US 8,346,173 B2
(45) Date of Patent: Jan. 1, 2013

(54) APPARATUS AND METHODS FOR INTERCELL INTERFERENCE CANCELLATION VIA RNTI

(75) Inventors: Wanshi Chen, San Diego, CA (US); Juan Montojo, San Diego, CA (US); Alexei Y. Gorokhov, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 436 days.

(21) Appl. No.: 12/727,177

(22) Filed: Mar. 18, 2010

(65) Prior Publication Data

US 2010/0255852 A1   Oct. 7, 2010

Related U.S. Application Data

(60) Provisional application No. 61/162,187, filed on Mar. 20, 2009.

(51) Int. Cl.
*H04B 1/00* (2006.01)
*H04B 15/00* (2006.01)

(52) U.S. Cl. .... 455/63.1; 455/450; 455/451; 455/452.1; 455/452.2; 455/67.11; 455/509; 370/329; 370/330; 370/332; 370/341; 370/348; 370/431

(58) Field of Classification Search .................. 455/450, 455/451, 452.1, 452.2, 63.1, 67.11, 509; 370/329, 330, 332, 341, 348, 431
See application file for complete search history.

(56) References Cited

U.S. PATENT DOCUMENTS

| | | | |
|---|---|---|---|
| 7,756,081 B2 * | 7/2010 | Park et al. | 370/329 |
| 7,979,769 B2 * | 7/2011 | Chun et al. | 714/748 |
| 2003/0003906 A1 | 1/2003 | Demers et al. | |
| 2008/0139214 A1 | 6/2008 | Sun et al. | |
| 2008/0200179 A1 * | 8/2008 | Jen | 455/452.2 |

OTHER PUBLICATIONS

International Search Report and Written Opinion—PCT/US2010/028040, International Search Authority—European Patent Office Jul. 16, 2010.

* cited by examiner

*Primary Examiner* — Olumide T Ajibade Akonai
(74) *Attorney, Agent, or Firm* — Paul Kuo

(57) ABSTRACT

A method and system facilitate inter-cell interference cancellation in a wireless network. An RNTI component manages a set of radio network temporary identifiers (RNTIs) for a plurality of user equipment (UE). The RNTI component determines whether the UEs will likely cause interference with a neighboring cell and/or experience interference from a neighboring cell, based on a respective attribute of the UEs. The RNTI component includes a space splitting component that divides the set of RNTIs into at least two subsets based on the determination, and allocates a first group of the UEs that are determined to likely cause interference and/or experience interference to a first subset of the divided RNTIs, such that the UEs in the first group are allocated a corresponding one of the RNTIs among the first subset of RNTIs. An implicit broadcast component can implicitly broadcast the first subset of RNTIs to facilitate cancellation of interference possibly caused by the first group of UEs.

62 Claims, 8 Drawing Sheets

US 8,346,173 B2

APPARATUS AND METHODS FOR INTERCELL INTERFERENCE CANCELLATION VIA RNTI

CROSS-REFERENCE TO RELATED APPLICATIONS

This application claims priority under 35 U.S.C. §119(e) to U.S. Provisional Application No. 61/162,187, filed on Mar. 20, 2009. The entire contents of this prior application are incorporated herein by reference.

BACKGROUND

1. Field

The present disclosure relates to apparatus and methods for facilitating inter-cell interference cancellation, and more particularly, to systems and methods for facilitating inter-cell interference cancellation by implicitly broadcasting RNTI (radio network temporary identification) information and/or splitting RNTI space.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple user equipment (UE). Each UE can communicate with one or more base stations via transmissions on forward and reverse links. The forward link (or downlink) refers to the communication link from base stations to UEs, and the reverse link (or uplink) refers to the communication link from UEs to base stations. Optimization of network coverage and service quality are constant goals for wireless network operators. Due to the configuration of cellular systems, UEs may experience interference from one or more other UEs, and/or one or more non-serving cells. For example, a UE served by a base station may experience interference from another UE served by the same base station which is generally controlled within the same base station, and/or another UE served by a neighboring base station. To optimize network coverage and service quality, wireless network operators aim to mitigate and/or cancel such interference. Various approaches to mitigating such interference have been proposed, but those that use RNTIs (radio network temporary identifications) can be computationally intensive.

SUMMARY

An exemplary embodiment provides a method of facilitating inter-cell interference in a wireless network. The exemplary method includes managing, in a terminal of the wireless network, a set of RNTIs (radio network temporary identifiers) for a set of user equipment (UE) being served by the base station in the wireless network. The exemplary method also includes determining, in the terminal, whether the UEs will likely cause interference with at least one neighboring cell, based on at least one respective attribute of the UEs. In addition, the exemplary method includes dividing, in the terminal, the set of RNTIs into at least one first subset for the UEs that are determined to likely cause interference, and into at least one second subset for the UEs that are not determined to likely cause interference. The exemplary method also includes allocating, in the terminal, the UEs that are determined to likely cause interference to the at least one first subset of the RNTIs such that UEs that are determined to likely cause interference are respectively allocated a corresponding one of the RNTIs among the at least one first subset of RNTIs. Each allocated RNTI can uniquely identify a corresponding one of the UEs.

An exemplary embodiment provides a method of facilitating inter-cell interference cancellation in a wireless network. The exemplary method includes managing, in a terminal of the wireless network, a set of RNTIs for a set of UEs being served by the base station in the wireless network, and dividing, in the terminal, the set of RNTIs into a plurality of subsets. In addition, the exemplary method also includes allocating, in the terminal, a first group of the UEs to a first subset among the plurality of divided subsets, based on at least one criterion, such that UEs in the first group of the UEs are respectively allocated a corresponding one of the RNTIs among the first subset of RNTIs. Each allocated RNTI among the first subset of RNTIs is comprised of a first component uniquely identifying the first subset of RNTIs, and a second component uniquely identifying a corresponding one of the first group of UEs to which each RNTI of the first subset of RNTIs is respectively allocated. The exemplary method also includes implicitly broadcasting the first subset of RNTIs by broadcasting the first component of the RNTIs allocated among the first subset of RNTIs.

An exemplary embodiment also provides a computer-readable recording medium having a computer program recorded thereon that causes a computing device of a base station to execute any of the above-described exemplary methods of facilitating inter-cell interference cancellation.

An exemplary embodiment provides a computer-processing device having at least one processor configured to facilitate inter-cell interference cancellation. The at least one processor includes a first module configured to manage a set of RNTIs for a plurality of UE being served by a base station in a wireless network. The at least one processor also includes a second module configured to determine whether the UEs will likely cause interference with at least one of neighboring cell, based on at least one respective attribute of the UEs. In addition, the at least one processor includes a third module configured to divide the set of RNTIs into at least one first subset for the UEs that are determined by the second module likely to cause interference, and into at least one second subset for the UEs that are not determined by the second module as likely to cause interference. Moreover, the at least one processor includes a fourth module configured to allocate the UEs that are determined to likely cause interference to the at least one first subset of the RNTIs such that UEs that are determined to likely cause interference are respectively allocated a corresponding one of the RNTIs among the at least one first subset of RNTIs. Each allocated RNTI can uniquely identify a corresponding one of the UEs to which the RNTI is respectively allocated.

An exemplary embodiment provides an apparatus that can facilitate inter-cell interference cancellation. The exemplary apparatus includes means for managing a set of RNTIs (remote network temporary identifiers) for a set of UE (user equipment) being served by a base station in a wireless network, and means for determining whether the UEs will likely cause interference with at least one neighboring cell, based on at least one respective attribute of the UEs. The exemplary apparatus also includes means for dividing the set of RNTIs into at least one first subset for the UEs that are determined to likely cause interference, and into at least one second subset for the UEs that not determined to likely cause interference. In addition, the exemplary apparatus includes means for allocating the UEs that are determined to likely cause interference to the at least one first subset of the RNTIs such that UEs that are determined to likely cause interference are respectively allocated a corresponding one of the RNTIs among the at least one first subset of RNTIs. Each allocated RNTI can uniquely identify a corresponding one of the UEs to which the RNTIs are respectively allocated.

An exemplary embodiment provides an apparatus that can facilitate inter-cell interference cancellation. The exemplary apparatus includes a transmitter configured to broadcast content to a plurality of user equipment (UE) in a wireless network. The content transmitted from the transmitter contains an RNTI that is respectively unique to the UE to which the content is transmitted. The exemplary apparatus also includes an RNTI component, which includes a space splitting component and an implicit broadcast component. The space splitting component is configured to maintain a set of RNTIs for the plurality of UEs, and divide the set of RNTIs into a plurality of subsets based on at least one respective attribute of the plurality of UEs. In addition, the space splitting component is configured to allocate a first group of the plurality of UEs to a first subset of the divided RNTIs, based on the respective attribute of the UEs in the first group of UEs, such that UEs in the first group of UEs are respectively allocated a corresponding one of the RNTIs among the first subset of RNTIS. Each allocated RNTI among the first subset of RNTIS includes a first component uniquely identifying the first subset of RNTIS, and a second component uniquely identifying a corresponding one of the first group of UEs to which each RNTI of the first subset of RNTIs is respectively allocated. The implicit broadcast component is configured to cause the transmitter to broadcast the first subset of RNTIs implicitly by broadcasting the first component of the RNTIs allocated among the first subset of RNTIs.

An exemplary embodiment provides a user equipment (UE) configured to be served a terminal in a wireless network. The exemplary UE includes a reception unit configured to receive an RNTI (radio network temporary identifier) allocated to the UE to uniquely identify the UE in a cell served by the terminal, to receive content from the terminal, and to receive a subset of RNTIs respectively allocated to UEs in at least one neighboring cell that are likely to cause interference with the UE in the cell served by the terminal. The exemplary UE also includes a processing unit configured to scan the received subset of RNTIs allocated to the UEs in the at least one neighboring cell to determine at least one interfering UE among the UEs in the at least one neighboring cell that is causing interference with the UE in the cell served by the terminal and that has been allocated a corresponding one of the received subset of RNTIs. In addition, the exemplary UE includes a transmission unit configured to transmit an interference notification signal including an identity of the determined UE to at least one of the terminal and another terminal serving the at least one neighboring cell to initiate at least one of mitigation and cancellation of the interference caused by the determined UE.

DETAILED DESCRIPTION OF EXEMPLARY EMBODIMENTS

Figure 1:
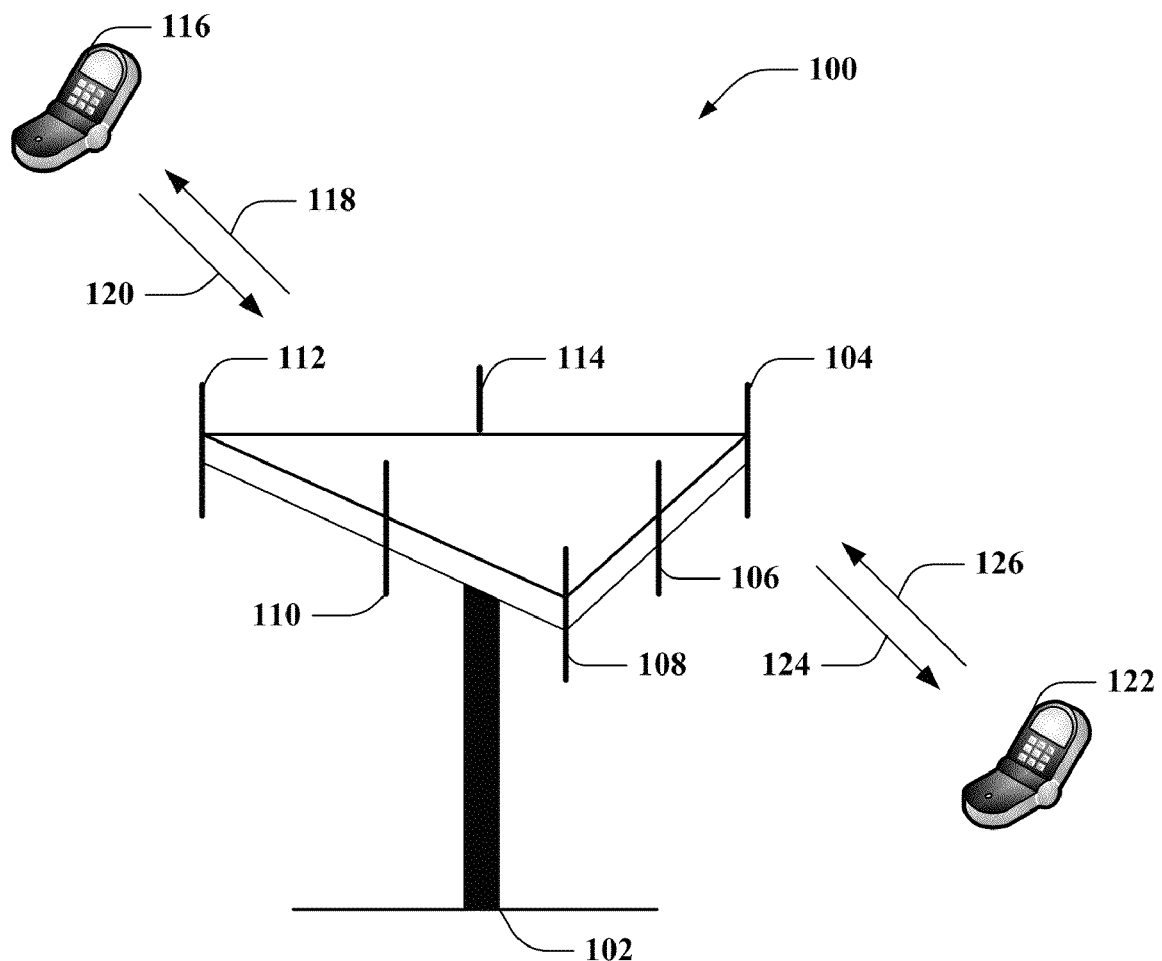
FIG. 1 illustrates an exemplary multiple access wireless communication system in accordance with an aspect of the subject specification.

Various aspects and exemplary embodiments of the present disclosure are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, including software recorded on a computer-readable recording (storage) medium that, when executed by a processor of a computing device (e.g., CPU), causes the computing device to perform operations defined in the software. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution, and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal with wireless capability or a wireless terminal. A terminal can also be called a system, device, subscriber unit, subscriber station, mobile station, mobile, UE, base station, remote station, remote terminal, access terminal, user terminal, terminal, communication device, user agent, user device, or, as used herein, user equipment (UE). A terminal can be part of a component, or a component can be a part of the terminal. A UE may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station (including macro cell, micro cell, pico cell or femto cell base station) may be utilized for communicating with a wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. Similarly, the phrase "at least one of" is intended to mean an inclusive "or" rather than an exclusive "or." That is, unless specified otherwise, or clear from the context, the phrase "the terminal communicates to at least one A and B" is satisfied by any of the following: the terminal communicates to A; the terminal communicates to B; or the terminal communicates to both A and B. In addition, the articles "a" and "an" as used in this application and the appended claims should generally be construed to mean "one or more" unless specified otherwise or clear from the context to be directed to a singular form. As used herein, the term "means" and/or the phrase "means for" is intended to encompass a structural component that performs a specified function as described herein. Examples of the structural components are described herein with respect to "means" elements as set forth in the following detailed description of exemplary embodiments and the appended claims. The various means elements as described herein encompass the structural components described with respect to the various means and equivalents thereof.

The techniques described herein may be used for various wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired, unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

I. Exemplary Cellular Architecture and Operation

Referring now to FIG. 1, a wireless communication system 100 is illustrated in accordance with various exemplary embodiments presented herein. The system 100 comprises a base station 102 that can include multiple antenna groups. For example, one antenna group can include a first set of antennas 104 and 106, another group can comprise a second, different set of antennas 108 and 110, and an additional group can include a third set of antennas 112 and 114. Two antennas are illustrated for each antenna group; however, more or fewer antennas can be utilized for each group. The base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

A base station 102 can communicate with one or more UEs such as first UE 116 and a second UE 122; however, it is to be appreciated that the base station 102 can communicate with substantially any number of UEs similar to first and second UEs 116 and 122. The first and second UEs 116 and 122 can be, for example, cellular phones, smart phones, laptops, handheld communication devices, handheld computing devices, satellite radios, global positioning systems, PDAs, and/or any other suitable device for communicating over a wireless communication system 100. As depicted, a first UE 116 is in communication with a third set of antennas 112 and 114, where the third set of antennas 112 and 114 transmit information to the first UE 116 over a first forward link 118 and receive information from the first UE 116 over a first reverse link 120. Moreover, the second UE 122 is in communication with the first set of antennas 104 and 106, where the first set of antennas 104 and 106 transmit information to the second UE 122 over a second forward link 124 and receive information from the second UE 122 over a second reverse link 126. In a frequency division duplex (FDD) system, a first forward link 118 can utilize a different frequency band than that used by the first reverse link 120, and the second forward link 124 can employ a different frequency band than that employed by the second reverse link 126, for example. Further, in a time division duplex (TDD) system, the first forward link 118 and the first reverse link 120 can utilize a common frequency band and the second forward link 124 and the second reverse link 126 can utilize a common frequency band.

Each group of antennas and/or the area in which they are designated to communicate can be referred to as a sector of base station 102, the various sectors forming a cell for a single base station 102. For example, antenna groups can be designed to communicate to UEs in a sector of the areas covered by the base station 102. In communication over first and second forward links 118 and 124, the transmitting antennas of the base station 102 can utilize beam-forming to improve signal-to-noise ratio of the first and second forward links 118 and 124 for the first and second UEs 116 and 122. This can be provided by using a precoder to steer signals in desired directions, for example. Also, while the base station 102 utilizes beam-forming to transmit to the first and second UEs 116 and 122, the beams scatter randomly through an associated coverage area, and UEs in neighboring cells (e.g., macro-cells, pico-cells and/or femtocells) can be subject to less interference as compared to a base station transmitting through a single antenna to all its UEs. Moreover, first and second UEs 116 and 122 can communicate directly with one another using a peer-to-peer or ad hoc technology in one example. As used herein, a "neighboring cell" may be one or more of a macro-cell, micro-cell, pico-cell and/or femtocell, regardless of whether the cells overlap, partly overlap, or adjacent to each other.

Figure 2:
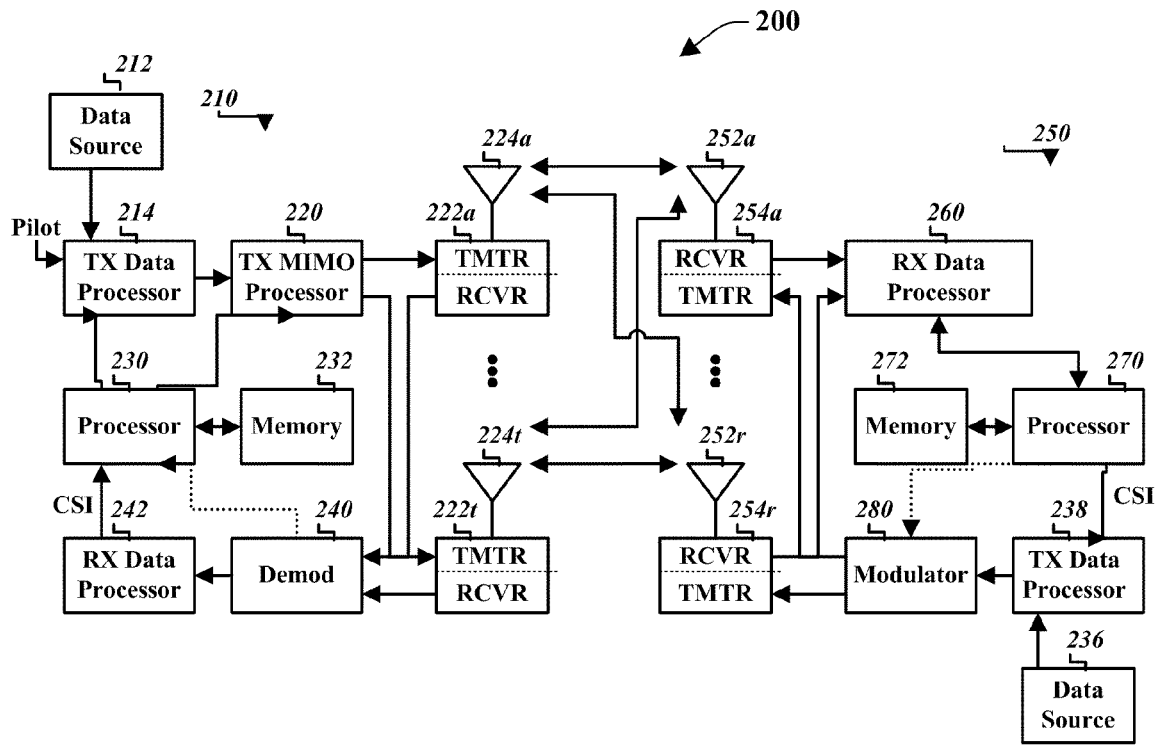
FIG. 2 illustrates a general block diagram of an exemplary communication system in accordance with an aspect of the subject specification.

FIG. 2 is a block diagram of a transmitter system 210 (also known as the access point) and a receiver system 250 (also known as access terminal) in a multiple-input and multiple-output (MIMO) system 200. At the transmitter system 210, traffic data for a number of data streams is provided from a data source 212 to a transmitter (TX) data processor 214.

In an exemplary embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230 in the TX data processor 214.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In an exemplary embodiment, the TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from the receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

Figure 3:
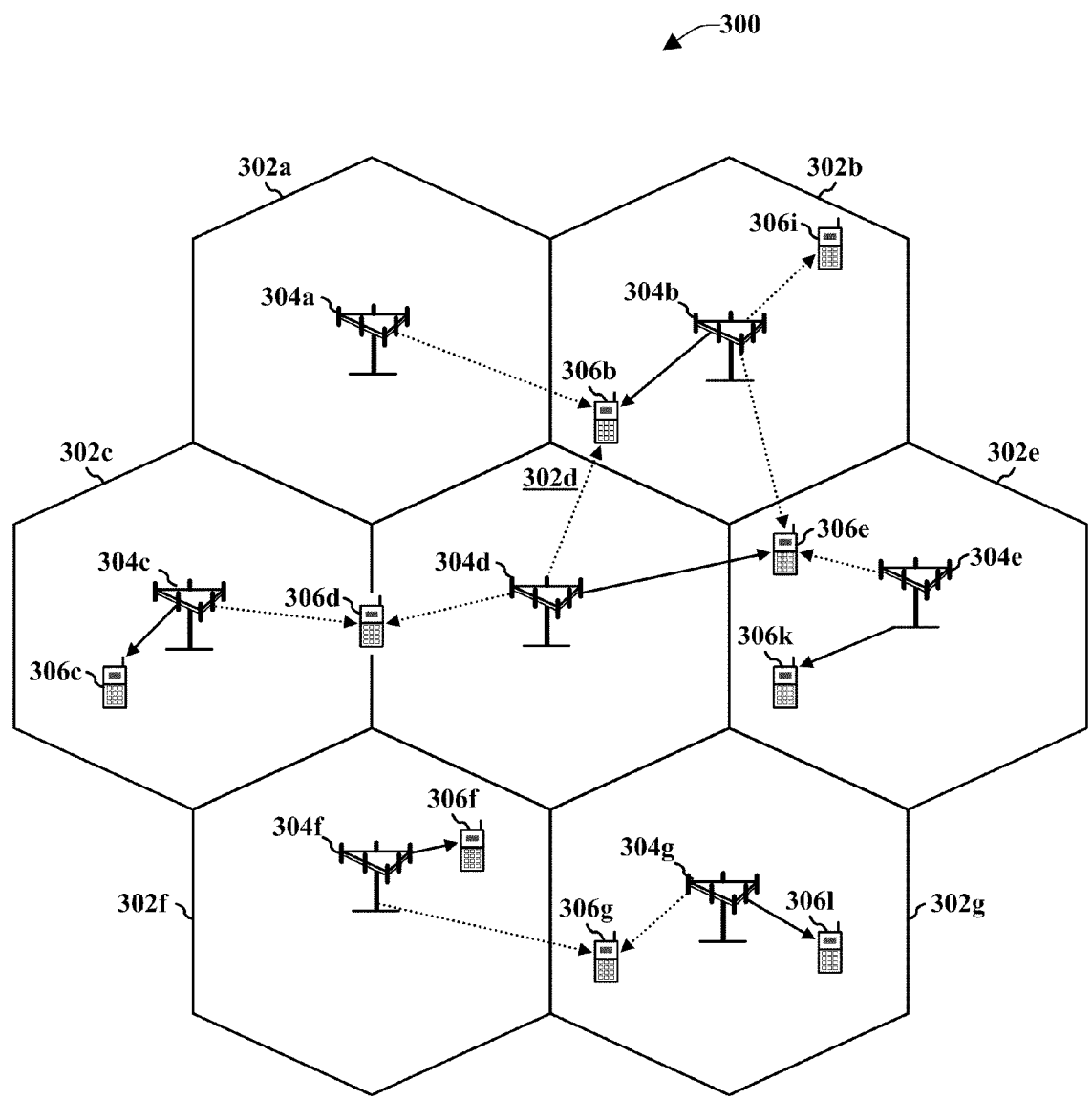
FIG. 3 illustrates an exemplary wireless communication system in accordance with an aspect of the subject specification.

II. RNTI Management in Accordance with Exemplary Systems and Methods of Present Disclosure FIG. 3 illustrates an exemplary wireless communication system 300 configured to support a number of users, in which various disclosed embodiments and aspects of the present disclosure may be implemented. As shown in FIG. 3, by way of example, the system 300 provides communication for multiple cells 302, such as, for example, macro cells 302a-302g, with each cell being served by a corresponding base station (BS) 304 (such as first through seventh BSs 304a-304g), which are examples of terminals in the exemplary system 300. Each cell may be further divided into one or more sectors (e.g. to serve one or more frequencies). Various BSs 306, including first through eleventh UEs 306a-306k, which are also known interchangeably as user equipment (UE) or mobile stations, are dispersed throughout the system. Each UE 306 may communicate with one or more BSs 304 on a forward link (FL) and/or a reverse link (RL) at a given moment, depending upon whether the UE 306 is active and whether it is in soft handoff, for example. The wireless communication system 300 may provide service over a large geographic region; for example, macro cells 302a-302g may cover a few blocks in a neighborhood.

In addition, the wireless communication system 300 can be comprised of a heterogeneous network, wherein different BSs 304 have different power classes, different antenna gain differences, and so forth. Consequently, even where a plurality of UEs 306 are located about the same distance away from an BS 304, the receive power at the BSs 304 can vary. For example, in a heterogeneous network there can be a plurality of macro cells (discussed above), one or more pico-cells, and one or more femtocells, for example. The pico-cells can be arranged to cover areas with heavy user traffic, and so forth, and the femtocells can be arranged to cover smaller areas such as a home or business, for example. This can lead to inter-cell interference. For example, if a first UE 306 is being served by a pico-cell of a lower power, the first UE 306 may experience very strong interference from a neighboring cell, such as macro-cell, for example, due to the higher transmission strength of the macro-cell. There have been various approaches at mitigating inter-cell interference, such as successive interference calculation (SIC), inter-cell interference coordination scheduling, uplink inter-cell interference coordination, and the transmission of synchronization control signals to UEs such as mobile devices.

In order to minimize the interference seen by the UE 306 in the foregoing examples, the UE 306 can be configured to employ some interference cancellation. For example, if a first UE 306 is being served by a macro cell BS 304 and is experiencing strong interference from a pico-cell BS 304, and if the first UE 306 knows all the information about a second UE 306 that is causing the interference, then the first UE 306 can employ interference cancellation to minimize the impact of the interference, according to an exemplary embodiment. However, in order to perform the interference cancellation, the first UE 306 must know the identity of the second UE 306 that is causing interference. Typically, the pertinent UE 306 information necessary for interference cancellation is scheduled by other BSs 304 that are not available to the first UE 306. One option is for the first UE 306 to attempt to discover the identity of the second UE 306 via blind detection. For example, in LTE (Long Term Evolution), each UE 306 is going to have at least one unique ID (e.g., RNTI). Each UE 306 can be respectively allocated one or more types of RNTIs. For example, a UE 306 can be allocated a cell RNTI (C-RNTI) for regular dynamic scheduling in the cell in which the UE 306 is being served, a semi-persistent scheduling RNTI (SPS-RNTI) for semi-persistent scheduling in the serving cell, a temporary cell RNTI (T-RNTI) for identification of a UE 306 as it transitions between two neighboring cells (e.g., a handoff), a system information (SI-RNTI) for the transmission and/or reception of system information, a paging RNTI (P-RNTI) for identifying a UE 306 for transmission and/or reception of paging information, a random access RNTI (RA-RNTI) for identifying a UE 306 in a random access response, etc. Other types of RNTIs can be allocated to a UE 306 to uniquely identify the UE 306 with respect to some parameter of operation. The present disclosure is not limited to the specific types of RNTIs described herein, and any RNTI developed in the future is to be encompassed within the techniques of the present disclosure. The RNTI(s) is/are used by the UEs 306 and serving cells for a plurality of purposes, including as a downlink control channel, wherein the UE 306 can determine that downlink is intended for the UE 306 based on the RNTI. The RNTI can be used to scramble various content of the control channel (in conjunction with other mechanisms), and as a consequence, only the UE 306 having that RNTI can decode the content. In other words, if there is UE 306 specific control content, then the UE 306 has to use its own RNTI to determine if the control content is intended for the UE 306. For example, according to an exemplary embodiment, the RNTI can be used to scramble and/or mask an error detecting code, such as a cyclic redundancy check (CRC), carried on a physical downlink control channel (PDCH), which may be used for transmitting downlink (DL) control information from the BS 304 to the UE 306. As another example, the RNTI can be used to scramble and/or mask various content carried on a physical downlink shared channel (PDSCH), which may be used for unicast transmission and possibly for transmission of paging information to the UE 306.

The first UE 306 can determine the neighboring cell IDs with little difficulty; however the first UE 306 does not know which UEs 306 the neighboring cells are scheduling. As mentioned previously, the first UE 306 can perform blind detection to discover which UEs 306 the neighboring cells are scheduling. However, this can be very inefficient and computationally intensive. For example, if the RNTI has sixteen (16) bits (e.g., $2^{16}$ possible RNTIs), during a brute force detection routine, the first UE 306 would scan all the possible RNTIs transmitted by the neighboring cells to discover which of the transmitted RNTIs actually mesh with the interference, which would be computationally intensive. It is to be appreciated that the foregoing is but one example and those skilled in the art will be able to readily identify equivalent examples. For example, inter-cell interference can result from neighboring macro cells in a homogenous network.

In accordance with an exemplary embodiment, two possible techniques are provided for facilitating inter-cell interference cancellation. For example, exemplary embodiments of the present disclosure provide that the RNTI space can be split into two or more groups or subsets, and/or all or part of the RNTIs allocated to the UEs can be implicitly broadcast, as described in greater detail below. Any suitable RNTI-based interference cancellation or mitigation protocols would benefit from the techniques of the present disclosure.

Figure 4:
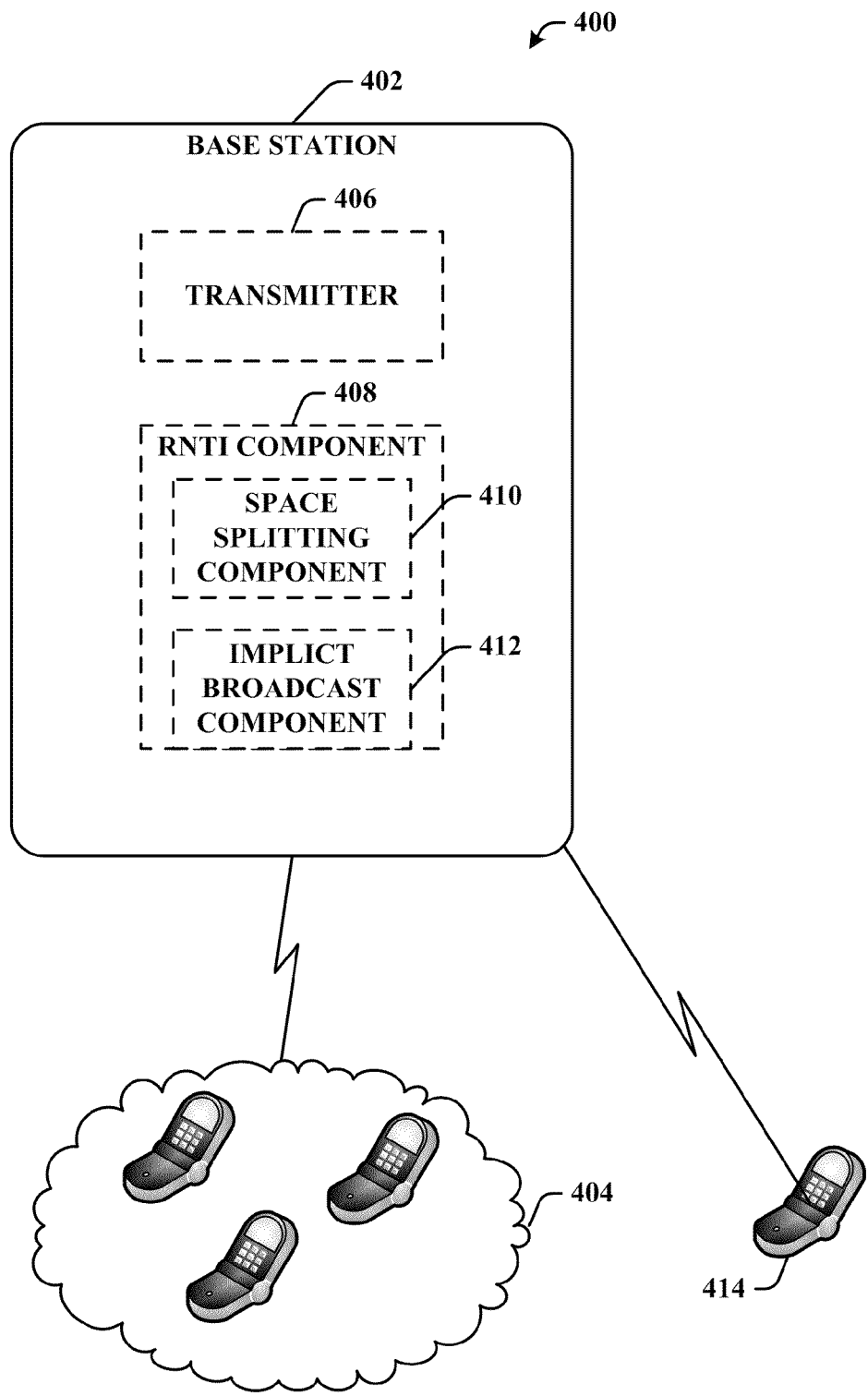
FIG. 4 illustrates an exemplary wireless communication system in accordance with an embodiment of the subject specification.

Turning now to FIG. 4, an exemplary wireless communication system 400 is shown in accordance with an embodiment of the subject innovation. The communication system 400 includes a base station 402 that is an example of a terminal serving a plurality of mobile devices 404, which are an example of user equipment (UE). In addition, the base station 402 includes a transmitter 406, and a RNTI component 408. The transmitter 406 is responsible for the mechanics of downlink (DL) transmission with the UEs 404. For example, a common search space can be used to carry the IC-RNTI PDCCH, and the IC-RNTI PDCCH size may be aligned with other PDCCHs in the common search space (format 1A, 1C) in order to maintain or reduce the number of blind detections in PDCCH. If the PDSCH is to be used to carry the actual RNTIs, format 1C type DL resource allocation may be similarly used for its link efficiency.

The RNTI component 408 manages RNTIs for UEs in order to mitigate the interference discussed earlier. For example, the RNTI component 408 can manage a set of RNTIs for a set of UEs 404 that are presently being served by the base station 402. The RNTI component 408 can manage different sets of RNTIs for respectively different types of RNTIs. For example, the RNTI component 408 can manage a plurality of sets of RNTIs respectively corresponding to a plurality of RNTIs, such as C-RNTIs, SRS-RNTIs, T-RNTIs, S-RNTIs, P-RNTIs and RA-RNTIs. According to an exemplary embodiment, the RNTI component 408 can constitute a means for managing a set(s) of RNTIs for a set of UEs 404.

The RNTI component 408 can determine whether the UEs 404 will likely cause interference (e.g., uplink interference) with at least one neighboring cell (e.g., macro-cell, pico-cell and/or femtocell) and/or experience interference (e.g., downlink interference) from at least one neighboring cell, based on a respective attribute of each UE 404 presently being served in the cell in which the base station 402 is located. For example, with reference to the example of FIG. 4, the RNTI component 408 can determine whether the UEs 404 being served by the base station 402 will likely cause interference with a neighboring cell in which the UE 414 is being serviced, and/or determine whether the UEs 404 will likely experience interference with the neighboring cell in which the UE 414 is being served. Examples of attributes of the UEs 404 used by the RNTI component 408 to determine whether the UEs 404 will likely cause interference with at least one neighboring cell and/or experience interference from at least one neighboring cell are described below. According to an exemplary embodiment, the RNTI component 408 can constitute a means for determining whether the UEs 404 will likely cause interference with a neighboring cell and/or likely experience interference from a neighboring cell.

According to an exemplary embodiment, the RNTI component 408 can designate each UE 404 as an "interference UE" or a "non-interference UE" based on the determination of whether the UEs 404 will respectively likely cause interference with a neighboring cell and/or likely experience interference from a neighboring cell. If the RNTI component 408 determines that a UE 404 will likely cause interference with a neighboring cell and/or likely experience interference from a neighboring cell, the RNTI component 408 can designate the UE 404 as an interference UE. On the other hand, if the RNTI component 408 determines that a UE 404 will not likely cause interference with a neighboring cell and/or will not likely experience interference from a neighboring cell, the RNTI component 408 can designate the UE 404 as a non-interference UE. In the event that the RNTI component 408 determines that a UE 404 will likely cause interference with a neighboring cell, it is also possible that the UE 404 will likely experience interference from that same neighboring cell. However, there may be situations where, for example, if a UE 404 is likely to cause interference with a neighboring cell, the UE 404 may or may not be likely to experience interference from that same neighboring cell. Accordingly, the RNTI component 408 can separately designate the UEs 404 according to whether they will likely cause interference with a neighboring cell and whether they will likely experience interference with a neighboring cell. For example, the RNTI component 408 can provide four separate designations of whether (1) the UE 404 is likely to cause interference with a neighboring cell, (2) the UE 404 is likely to experience interference with a neighboring cell, (3) the UE 404 is not likely to cause interference with a neighboring cell, and (4) the UE 404 is not likely to experience interference with a neighboring cell. In this example, the RNTI component 408 can be configured to designate a UE 404 as an "interference UE" if the UE 404 is designated with designation category (1) and/or (2). On the other hand, in this example, the RNTI component 404 can be configured to designate a UE 404 as a "non-interference UE" if the UE 404 is designated with designation categories (3) and/or (4). The designation parameters can be modifiable to accommodate various operating conditions in the general cellular network and/or the serving cell in which the base station 402 is located. According to an exemplary embodiment, the RNTI component 408 can constitute a means for respectively designating each UE 404 as an interference UE or a non-interference UE, based on the determination of whether the UEs 404 will respectively likely cause interference with a neighboring cell and/or likely experience interference from a neighboring cell.

As shown in FIG. 4, the RNTI component 408 includes a space splitting component 410, and an implicit broadcast component 412. The space splitting component 410 divides, splits, or otherwise separates the base station's 402 RNTIs into a plurality of groups based on various criteria, such as a respective attribute of each UE 404 being served by the base station 402. For example, based on the determination by the RNTI component 408 of whether the UEs 404 are respectively likely to cause interference with at least one neighboring cell, the space slitting component 410 can divide the managed set of RNTIs for the UEs 404 into at least one first subset (e.g., subset A) for the UEs 404 that are determined to likely cause interference with a neighboring cell, and into at least one second subset (e.g., subset B) for the UEs 404 that are not determined to likely cause interference with a neighboring cell. In this example, subset A of the divided set of RNTIs can constitute a subset for inter-cell interference cancellation (ICIC) related RNTIs (e.g., category 2), whereas subset B of the divided set of RNTIs can constitute a subset for non-ICIC-related RNTIs (e.g., category 1). According to an exemplary embodiment, an ICIC-related RNTI is an RNTI that can be allocated to a UE 404 which has been determined by the RNTI component 408 as likely causing interference with a neighboring cell. Conversely, a non-ICIC related RNTI is an RNTI that can be allocated to a UE 404 which has been determined by the RNTI component 408 as not being likely to cause interference with a neighboring cell. For example, as mentioned above, the RNTI component 408 can manage different sets of RNTIs for respectively different types of RNTIs, such as C-RNTIs and SPS-RNTIs. If the base station UEs 404 in the serving cell are each allocated a C-RNTI, for example, the C-RNTIs can be allocated to the UEs 404 based on whether the UEs 404 are respectively likely to cause interference with a neighboring cell (category 2) or not likely to cause interference with a neighboring cell (category 1). If the RNTI component 408 manages different sets of RNTIs for respectively different types of RNTIs, the space splitting component 410 can be configured to respectively divide each different set of RNTIs into a suitable numbers of subsets. For example, if the RNTI component 408 manages a set of C-RNTIs and a set of SRS-RNTIs that can be respectively allocated to UEs 404 in the serving cell, the space splitting component 410 can divide the set of C-RNTIs into one or more category 1 subsets of C-RNTIs and into one or more category 2 subsets of C-RNTIs, and the space splitting component 410 can divide the set of SPS-RNTIs into one or more category 1 subsets of SPS-RNTIs and into one or more category 2 subsets of SPS-RNTIs. Alternatively, if the RNTI component 408 manages different sets of RNTIs for respectively different types of RNTIs, the space splitting component 410 can be configured to divide the different sets of RNTIs into two or more common subsets, such as one or more category 1 subsets and one or more category 2 subsets. For example, if the RNTI component 408 manages a set of C-RNTIs and a set of SRS-RNTIs that can be respectively allocated to UEs 404 in the serving cell, the space splitting component 410 can divide the sets of C-RNTIs and SRS-RNTIs into one or more common category 1 subsets, and divide the sets of C-RNTIs and SRS-RNTIs into one or more common category 2 subsets. For the sake of clarity, exemplary embodiments of the present disclosure are described below in which the space splitting component 410 generically divides a single set of RNTIs into two or more different subsets based on one or more criteria. However, it is to be understood that if the RNTI component 408 manages different sets of RNTIs for different types of RNTIs, the space splitting component 410 can be configured to divide the different sets of RNTIs into one or more category 1 subsets and into one or more category 2 subsets, where different subsets can be respectively divided for the different sets of RNTIs and/or common subsets can be divided for the different sets of RNTIs. According to an exemplary embodiment, the space splitting component 410 can constitute a means for dividing the set(s) of RNTIs managed by the RNTI component 408, into at least two subsets or groups of RNTIs.

There are many ways to manage the RNTI space in this exemplary system. For instance, the number of category 1 subsets and the number of category subsets 2 can be set when setting up the cellular system, or can be dynamically adjusted to accommodate different operating conditions in the overall cellular system and/or in an individual cell being served by the base station 402. Each cell within a cellular system can be uniform in RNTI management, or can be a hybrid of set and dynamically adjusted cells. For example, at time 1, the space splitting component 410 can be configured to divide the set of RNTIs into a total of, for example, four subsets (subsets A1-A4) for the UEs 404 that are determined to likely cause interference with a neighboring cell, and divide the set of RNTIs into a total of, for example, eight subsets (subsets B1-B8) for the UEs that are not determined to likely cause interference with a neighboring cell. Suppose, for example, that during a reallocation of the RNTIs at time 2 after time 1, the RNTI component 408 determines that an increased number of UEs 404 are likely to cause interference with a neighboring cell. Based on this determination, the space splitting component 410 can, at time 2, divide the set of RNTIs into a total of, for example, six subsets for the UEs 404 (subsets A1-A6) that are determined to likely cause interference by the RNTI component 408, and divide the set of RNTIs into a total of, for example, three subsets (subsets B1-B3) for the UEs 404 that are not determined to likely cause interference by the RNTI component 408.

The space splitting component 410 can also be configured to allocate UEs to a corresponding one of the divided subsets of RNTIs. For example, the space splitting component 410 can allocate the UEs 404 that are determined to likely cause interference to subset A, such that the UEs 404 that are determined to likely cause interference are respectively allocated a corresponding one of the RNTIs included in subset A of the managed RNTIs, as implied above. Conversely, the space splitting component 410 can allocate the UEs 404 that are not determined to likely cause interference to subset B of the managed RNTIs, such that the UEs 404 that are not determined to likely cause interference are respectively allocated a corresponding one of the RNTIs included in subset B of the managed RNTIs. If the RNTI component 408 is managing two or more sets of RNTIs, such as a set of C-RNTIs and a set of SRS-RNTIs, for example, for allocation to the UEs 404 in the serving cell, and the space splitting component 410 divides the different sets of RNTIs into different subsets based on the different type of RNTIs, the space splitting component 410 can allocate the UEs 404 that are determined to likely cause interference to subset $A_{C-RNTI}$ and to subset $A_{SRS-RNTI}$, such that the UEs 404 that are determined to likely cause interference are respectively allocated a corresponding one of the C-RNTIs included in subset $A_{C-RNTI}$ of the managed set of C-RNTIs and are respectively allocated a corresponding one of the SRS-RNTIs included in the subset $A_{SRS-RNTI}$ of the managed set of SRS-RNTIs. Conversely, the space splitting component 410 can allocate the UEs 404 that are not determined to likely cause interference to subset $B_{C-RNTI}$ and to subset $B_{SRS-RNTI}$, such that the UEs 404 that are not determined to likely cause interference are respectively allocated a corresponding one of the C-RNTIs included in subset $B_{C-RNTI}$ of the managed set of C-RNTIs and are respectively allocated a corresponding one of the SRS-RNTIs included in subset $B_{SRS-RNTI}$ of the managed set of SRS-RNTIs. Alternatively, in this example where the RNTI component 408 manages different sets of RNTIs for C-RNTIs and SRS-RNTIs, if the space splitting component 410 divides the different sets of RNTIs into common subsets, the space splitting component can allocate the UEs 404 that are determined to likely cause interference to subset $A_{C-RNTI\ and\ SRS-RNTI}$, such that the UEs 404 that are determined to likely cause interference are respectively allocated a corresponding one of the C-RNTIs and a corresponding one of the SRS-RNTIs included in subset $A_{C-RNTI\ and\ SRS-RNTI}$. Conversely, the space splitting component can allocate the UEs 404 that are not determined to likely cause interference to subset $B_{C-RNTI\ and\ SRS-RNTI}$, such that the UEs 404 that are not determined to likely cause interference are respectively allocated a corresponding one of the C-RNTIs and a corresponding one of the SRS-RNTIs included in subset $B_{C-RNTI\ and\ SRS-RNTI}$.

Accordingly, by dividing the managed set of RNTIs into at least two groups or subsets and then respectively allocating UEs 404 to an appropriate one of the divided subsets of RNTIs, the space splitting component 410 can effectively divide the UEs 404 into two groups, such as a first group for ICIC-related RNTIs (e.g., category 1), and a second group for non-ICIC-related RNTIs (e.g., category 2). According to an exemplary embodiment, the space splitting component 410 can constitute a means for allocating a first group of UEs 404 to a first subset of divided RNTIs managed by the RNTI component 408, and for allocating a second group of UEs 404 to a second subset of divided RNTIs managed by the RNTI component 408, based on or more criteria. In the foregoing example, the space splitting component 410 allocated the group of UEs 404 that were determined to likely cause interference with a neighboring cell to subset A of the divided RNTIs, and allocated the group of UEs 404 that were not determined to likely cause interference with a neighboring cell to subset B of the divided RNTIs. Accordingly, an example of the criteria for allocating the UEs to one of the subsets of RNTIs can be whether the UEs 404 being served by the base station 402 are will likely cause interference with a neighboring cell.

As described above, the space splitting component 410 can divide the set of RNTIs into one or more subsets for the UEs 404 that are determined to likely cause interference, and into one or more subsets for the UEs 404 that are not determined to likely cause interference. The subsets can be divided to respectively accommodate allocation of a predetermined number of UEs 404. For example, the space splitting component 410 can divide the RNTIs into, for example, four subsets for the UEs 404 that are determined by the RNTI component 408 as likely to cause interference, where each of these subsets would accommodate allocation of, for example, a total of fifty UEs 404. In this example, when fifty UEs 404 are allocated to a first one of the divided subsets, the next fifty UEs 404 that are determined to likely cause interference are allocated to a second of the divided subsets, and so on. The subset(s) divided for the UEs 404 that are not determined to likely cause interference can similarly have a predetermined numerical allocation limit. The space splitting component 410 can be configured to, by default, allocate UEs 404 that are not determined to likely cause interference to a corresponding one of the subsets for the UEs that are not likely to cause interference. However, if appropriate based on operating conditions of the cell, the space splitting component 410 can allocate one or more of the UEs 404 that are not determined to likely cause interference to the one or more subset(s) for the UEs 404 that are determined to likely cause interference. For example, if one of the attributes used to determine whether a UE 404 will likely cause interference is the degree of proximity of a UE to the cell edge, and if the RNTI component 408 determines that a particular UE 404 is not presently located at the edge of the cell but, based on observed movements, the UE 404 may be located near the edge of the cell in the near future, the space splitting component 410 can allocate this UE 404 to a subset of UEs that are determined to likely cause interference.

As mentioned above, the space splitting component 410 can divide the set(s) of RNTIs that are managed for the UEs 404 based on a respective attribute of each of the UEs 404. For example, a plurality of UEs may be monitoring a cell that may not be served by the cell, because the UE 404 does not have any data to transmit or receive (e.g., the UE is inactive). The respective activity state (e.g., active or inactive) of each UE 404 is an example of an attribute of the UEs for determining whether the UEs 404 will likely cause interference with a neighboring cell and/or experience interference from a neighboring cell. In addition, if the UE 404 is close to the serving cell, then the amount of interference that the UE is causing in other cells is going to inherently be very small. For example, a UE 404 that is very close to the base station 402 can transmit with lower power, and the base station 402 can similarly transmit signals to the UE 404 at a lower power. However, a UE 404 that is close to the cell edge is more likely to cause interference, because it will require higher power to transmit to the base station 402, and may resultantly cause interference (e.g., uplink interference) when transmitting to the base station 402. If the UE 404 is close to the cell edge, the UE 404 may also experience interference (e.g., downlink interference) from a neighboring cell if another base station serving the neighboring cell transmits at high power to a UE located at an edge of the neighboring cell near to the location of the UE 404 at the edge of the cell being served by the base station 402. Similarly, the base station 402 may have to transmit signals at a higher power to the UE 404 that is located close to the cell edge, and, as a result, UEs 414 located in the neighboring cell may experience interference (e.g., downlink interference) caused by the high power transmission from the base station 402 to the UE 404 located at the cell edge. Accordingly, the respective proximity of the UEs 404 to the base station 402 and a respective proximity of the UEs 404 to an edge of the serving cell in which the base station 402 is located are additional examples of attributes of the UEs 404 for determining whether the UEs 404 will likely cause interference with a neighboring cell and/or experience interference from a neighboring cell. According to an exemplary embodiment, the RNTI component 408 can determine that a UE 404 is likely to cause interference with a neighboring cell and/or experience interference from a neighboring cell when the UE 404 is closer in proximity to the edge of the cell than to the base station 402.

The RNTI component 408 can determine other attributes of a UE 404 to ascertain its geographic proximity to the base station 402 of the serving cell. For example, the RNTI component 408 can determine a geographic location of a particular UE 404 based on GPS coordinate information of the UE 404 (if the UE 404 is equipped with GPS tracking capabilities), triangulation of the UE 404 relative to the geographic locations of other UEs 404, the strength of a signal transmitted from the UE 404 to the base station 402 and/or the strength of a signal transmitted from the base station 402 to the UE 404. In addition, the RNTI component 408 can determine a geographic location of a UE 404 with respect to a sub-division of the cell served by the base station 402. For example, if the service area of a cell approximately resembles a circle around the base station 402, the cell can be divided into, e.g., three sectors, where each sector represents a third of the cell (e.g., a first sector ranging from 0° to 120° of the circle, a second sector at 121° to 240° of the circle, and a third sector at 241° to 360° of the circle). Based on the determined locations of the UEs 404 within the sub-divided sectors of the cell, different sets of RNTIs can be assigned to UEs in the different sectors of the cell. Furthermore, within these respectively different sets of RNTIs assigned for the different sectors of the cell, the space splitting component 410 can divide the RNTIs respectively assigned for each sector into (1) one or more subsets for UEs that are determined to be likely to cause interference, and (2) one more subsets for UEs that are not determined to likely cause interference. For example, in case the cell is divided into three sectors in accordance with the above example, the space splitting component 410 can divide a first set of RNTIs managed for the first sector into (1) one or more subsets for UEs 404 within the first sector that are determined to likely cause interference, and (2) one or more subsets for UEs 404 within the first sector that are not determined to likely cause interference. The space splitting component 410 can similarly divide the sets of RNTIs respectively managed for the second and third sectors into separate subsets for (1) UEs that are determined to likely cause interference and (2) UEs that are determined to likely cause interference. The present disclosure is not limited to the above example in which the cell is divided into three sectors based on an angular division of the cell. The cell can be divided into any number of sectors to achieve any desired form of division of the cell into different sectors. Further, a subset of RNTI can include at least one UE that has been determined to likely cause interference and/or experience interference, and the entire subset can then be designated as being identified as potentially causing and/or experiencing interference, since a UE in a neighboring cell would have to run through the entire subset, but this would still be less intensive than running through all possible RNTIs in ICIC determinations.

As an additional example, assuming there are one thousand UEs 404 monitoring the base station 402, nine hundred of the UEs 404 may be inactive, and of the remaining hundred UEs 404, sixty of the UEs 404 are close to the base station 402, and forty of the UEs 404 are close to the cell edge. In this example, the nine hundred inactive UEs and the sixty UEs that are close to the base station 402 will be assigned to category 1 by the space splitting component 410, and the forty UEs 404 that are close to the cell edge will be assigned to category 2. Moreover, the space splitting component 410 can dynamically update the categories. For example, a UE 404 that was inactive may become active, or a UE 404 that was close to the cell edge can move closer to the base station 402.

The dynamic updating of the RNTI allocation can occur at any predetermined time interval. For example, the RNTI component 408 can be configured to determine that a UE 404 will likely cause interference and/or experience interference when the UE 404 newly enters the cell served by the base station 402, because the UE 404 will be at the edge of the cell. If this UE 404 is determined to be in closer proximity to the base station 402 at a subsequent iteration of RNTI allocation (or re-allocation), the RNTI component 408 can determine that the UE 404 is no longer likely to cause interference and/or experience interference, based on the attribute of its geographic location relative to the base station 402, and the space splitting component 410 can accordingly allocate this UE 404 to the subset (or one of the subsets) of RNTIs for the UEs 404 that are not determined to likely cause interference.

The time interval in which RNTIs are dynamically allocated can depend on a variety of factors, including, for example, historical usage patterns in the cell, the number of UEs 404 being served in the cell, the amount of traffic in the cell, etc. For example, if an edge of the serving cell encompasses a portion of a highway or railroad track in which UEs 404 regularly pass through, the dynamic allocation of the RNTIs can be configured to occur more frequently so as to accommodate the introduction of new UEs 404 into the serving cell. According to an exemplary embodiment, UEs 404 allocated to the subset(s) of category 1 or the subset(s) of category 2 will remain allocated to the same subset until a new allocation for the UEs within the serving cell. For example, if a UE 404 newly enters the serving cell at the time of a first RNTI allocation and the RNTI component 408 determines that the newly entering UE will likely cause interference and/or experience interference because it is located at the edge of the cell, the space splitting component 410 will allocate the UE 404 to a subset (or one of the subsets) for the UEs that are determined to likely cause interference with a neighboring cell. If this UE 404 subsequently moves in closer proximity to the base station 420 but a new RNTI allocation has not yet been performed, the UE 404 will remain allocated to the subset (or one of the subsets) for the UEs that are determined to likely cause interference, until a new allocation is performed. If operating attributes of the UEs 404 are changed since the prior allocation, then the UEs with changed operating attributes may be allocated to the other category of subsets (e.g., category 2 subset to category 1 subset) at the time of the next allocation. For example, if a UE 404 is not determined to likely cause interference because it was in an inactive state at the time of the first dynamic allocation of RNTIs, but the UE 404 then becomes active (e.g., attempts to send data to the base station 402), the base station 402 can detect the change in the activity state of the UE 404 and dynamically reallocate RNTIs based on the changed activity state of the UE(s) 404.

According to an exemplary embodiment, the RNTI component 408 can be configured to assign at least one unique RNTI to a UE 404 at the time that the UE 404 enters the serving cell, such as when a hand-off occurs between the base station 402 and another base station serving a neighboring cell from which the UE 404 arrived. The RNTI component 408 can be configured to maintain the assignment of the same RNTI for a UE 404 during the entire period in which the UE 404 is continuously present in the serving cell. As described above, when the UE 404 first enters the cell, the UE 404 may be allocated to a subset of RNTIs for UEs that are determined to likely cause interference. According to an exemplary embodiment, the space splitting component 410 can be configured to switch the designation of an entire allocated subset of RNTIs between the category 1 designation and the category 2 designation. For example, if fifty UEs 404 are allocated to an RNTI-subset for UEs that are determined to likely cause interference, the RNTI component 408 can, at the time of a subsequent allocation (or re-allocation), determine that a predetermined number of the fifty UEs are now likely to cause interference. In this case, the space splitting component 410 can designate each of the fifty UEs in the subset, which was previously designated as containing UEs that are not likely to cause interference (i.e., category 1), as a subset of UEs that are determined to likely cause interference (i.e., category 2). For example, suppose at time 1, the RNTI component 408 determines that one thousand UEs 404 within the serving cell are not likely to cause interference with at least one neighboring cell, and the space splitting component 410 divides the RNTIs respectively assigned to these thousand UEs into ten different RNTI subsets of UEs that are not determined to likely cause interference, where each one of the subsets contains one hundred RNTIs, for example. Now suppose that, at time 2 after time 1, the RNTI component 408 determines that, for example, five UEs allocated to the third subset among the ten subsets of category 2 RNTIs are determined to likely cause interference with at least one neighboring cell. Based on this determination at time 2, the space splitting component 410 can be configured to newly designate the third subset, which was previously designated as a category 1 subset, as a category 2 subset. As a result, each of the UEs 404 allocated to the third subset among the ten category 1 subsets will then be allocated to a subset which is newly designated as a category 2 subset, without individually allocating the UEs in the third subset to a new subset. Accordingly, in addition to or as an alternative to modifying the allocation of individual UEs to particular category 1 or category 2 RNTI-subsets, the space splitting component 410 can dynamically modify the designation of whether an entire subset of RNTIs corresponds to a category 1 subset or a category 2 subset.

Any of the above techniques in dividing a set of RNTIs into one or more category 1 subsets and one or more category 2 subsets and allocating UEs into one of these subsets can be used individually or in combination depending on the comparative computing power of the base station 402, RNTI component 408 and processing components of the UEs 404.

Dividing the UEs 404 into categories by dividing the managed set of RNTIs into subsets and respectively allocating the UEs 404 to one of the divided subsets of RNTIs allows a UE 414 that is not being served by the base station 402 to scan, monitor, or otherwise check (e.g., blind detect) the base station's 402 scheduling more efficiently.

For example, the UE 414 can attempt to determine which of the UEs 404 is causing interference for the UE 414 in a neighboring cell (e.g., macro-cell, pico-cell and/or femto-cell), and the UE 414 only has to scan the RNTIs belonging to the UEs 404 that have been designated as possibly causing interference (e.g., category 2). For example, according to an exemplary embodiment, the transmitter 406 of the base station 402 can broadcast subset A of the RNTIs which were allocated to the UEs 404 that were determined to likely cause interference, to the UE 414 to enable the UE 414 to scan, monitor or otherwise check (e.g., blind detect) subset A of the RNTIs to detect which of the UEs 404 is causing interference for the UE 414 in the cell serving the UEs 404. According to this example, the UE 414 can scan the subset A of RNTIs allocated to the UEs that were determined to likely cause interference, and as a result, the UE 414 does not need to successively scan the RNTI allocated to each one of the UEs in the neighboring cell, which would be impractical. The transmitter 406 of the base station 402 can broadcast subset A of the divided RNTIs to the UE 414 directly or indirectly upon request, such as by communicating subset A of the divided RNTIs to another base station serving the UE 414, which can, in turn, broadcast the received subset A of the divided RNTIs to the UE 414. Similarly, the base station 402 can receive RNTIs allocated to UEs 414 in the neighboring cell that are likely to cause interference with one or more UEs 404 in the cell served by the base station 402, and the base station 402 can, in turn, broadcast the RNTIs of interfering UEs 414 to one or more UEs 404 in the serving cell which are determined to likely experience interference from the neighboring cell.

In addition, the transmitter 406 of the base station 402 can broadcast the allocated subset of RNTIs to a corresponding one of the UEs to which the subset of RNTIs were allocated by the space splitting component 410, via a physical downlink control channel (PDCCH) or a physical downlink shared channel (PDSCH). Broadcasting the allocated RNTIs to the specific UE 404 to which the RNTIs were respectively allocated can inform the corresponding UE that downlink is intended for it. According to an exemplary embodiment, the allocated RNTIs can constitute a control channel for the corresponding UE. Furthermore, as mentioned above, content in the control channel can be scrambled and/or masked so that only the UE 404 to which the RNTI was allocated can decode the content with the allocated RNTI.

The implicit broadcast component 412 can segment at least part of the RNTI space to include a group index. The RNTIs allocated to the UEs can contain a first component uniquely identifying a group of which the UEs are a member, and a second component that uniquely identifies the UE to which the RNTI was allocated. For example, the implicit broadcast component 412 can separate the UEs 404 into 12 groups (e.g., divided subsets of RNTIs), where the RNTI is comprised of 16 bits; the first 12 bits can be used to uniquely identify the group. Therefore, according to this example, each group would only include $2^4$ possible unique identifiers, which would clearly facilitate the UE 414 in detecting the interfering UE 404. For example, the implicit broadcast component 412 can broadcast the first 12 bits (i.e., the first component of the RNTIs) to inform neighboring cells of the group in which UEs 404 that may cause interference for the neighboring cells might reside, and the UE 414 would only have to search 16 possibilities (e.g., $2^4$). In this case, the dimension of the RNTI space is $N_1=2^{16}$. The space can be organized into $M_1$ groups, each of dimensions $N_1/M_1$. The broadcasted RNTI is the group index. The choice of $M_1$ (and hence $N_1/M_1$) is a tradeoff between system overhead and UE complexity. For example, the number of bits comprised in the entire RNTI and/or the number of bits comprised in the first and second components of the RNTI can be increased or reduced to accommodate an increased or decreased amount of UEs 404. The number of bits comprised in the RNTI as well as the first and second components of the RNTI can be set or can be dynamically modified to accommodate changes in the operating conditions of the overall cellular network and/or the serving cell. For example, the total number of RNTIs that can be allocated to UEs 404 in a particular serving cell can be constrained from a theoretical limit (e.g., from $2^{16}$ to $2^8$) to accommodate an increased or decreased number of UEs 404 in the serving cell. Accordingly, the present disclosure is not limited to the above example where the RNTI is comprised of sixteen bits. According to an exemplary embodiment, the implicit broadcast component 412 can constitute a means for implicitly broadcasting a group and/or subset of RNTIs by broadcasting the first component of the RNTIs allocated among the group and/or subset of the RNTIs.

Additionally or alternatively, the space splitting component 410 and implicit broadcast component 412 can operate in conjunction. For example, there can be a large number of UEs 404 may still be allocated to category 2 (e.g., subset A of the divided RNTIs) by the space splitting component 410, in which case it may still be very inefficient for the UE 414 to attempt blind detection. Therefore, the implicit broadcast component 412 can operate in tandem with the space splitting component 414 or soft-policing techniques to reduce the dimensions further. In this case, the dimension of the RNTI space is, for example, $N_2<N_1=2^{16}$. The reduced dimension can be either due to the "soft-policing" RNTI allocation or due to the RNTI space split when $N_2$ corresponds to the dimension of Category 2 discussed above. Again, the space can be organized into $M_2$ groups, each of dimensions $N_2/M_2$. The broadcasted RNTI is the group index. The choice of $M_2$ (and hence $N_2/M_2$) is also a tradeoff between system overhead and UE complexity. For example, with reference to FIG. 4, if the space splitting component 410 allocated a first group of the UEs 404 (e.g., UEs 404 located close to the edge of the serving cell) to subset A of the divided RNTIs, and allocated a second group of the UEs 404 (e.g., UEs 404 located close to the base station 402) to subset B of the divided RNTIs, the implicit broadcast component 412 can implicitly broadcast subset A of the divided RNTIs by broadcasting the first component of subset A that uniquely identifies the subset. It is to be appreciated that the foregoing are but a few examples, and those skilled in the art will be able to readily identify equivalent examples. For example, the techniques discussed above are not limited to downlink communications, and can also be applied to uplink communications in similar fashion.

As described above, the number of bits comprised in an RNTI is not limited to sixteen bits and may be dynamically adjusted to accommodate an increased or decreased amount of UEs 404 present in the serving cell. Similarly, the RNTI component 408 can dynamically adjust the number of bits comprised in the first and second components of an RNTI, to accommodate changes in the operating conditions of the overall cellular network and/or the serving cell, and to facilitate detection of an interfering UE in the serving cell by another UE in the same serving cell and/or in a neighboring cell. For example, if the RNTI is comprised of sixteen bits, the first component of the RNTI for identifying the particular group (e.g., divided subset) is twelve bits, and the second component for uniquely identifying a UE 404 to which the RNTI is assigned is four bits, when the implicit broadcasting component 412 broadcasts the first component of the RNTIs, the UE 414 in the neighboring cell would have to search 16 possibilities (e.g., $2^4$) for the interfering UE 404. To reduce the number of UEs 404 that the UE 4014 would have to search to determine an interfering UE 404 based on the implicitly broadcast RNTIs, the RNTI component 408 can reduce the number of bits comprised in the second component from four bits to three bits, for example. In this case, the UE 414 in the neighboring cell would have to search eight possibilities (e.g., $2^3$) to determine the interfering UE 404. In the event that there are more than sixteen potentially interfering UEs in a group of UEs 404 (e.g., UEs allocated to a category 2 subset), then the RNTI component 408 can similarly increase the number of bits comprised in the second component of the RNTIs to accommodate a greater number of potentially interfering UEs 404 that can be identified when the implicit broadcasting component 412 broadcasts the first component of the RNTIs. The number of bits comprised in the first component can also be dynamically adjusted to accommodate an increased or decreased number of UEs 404 in a particular group. Accordingly, the number of bits comprised in the RNTI, the number of bits comprised in the first component of the RNTI, and the number of bits comprised in the second component of the RNTI can be dynamically modified to accommodate different operating conditions in the overall cellular network and/or the serving cell.

Figure 5:
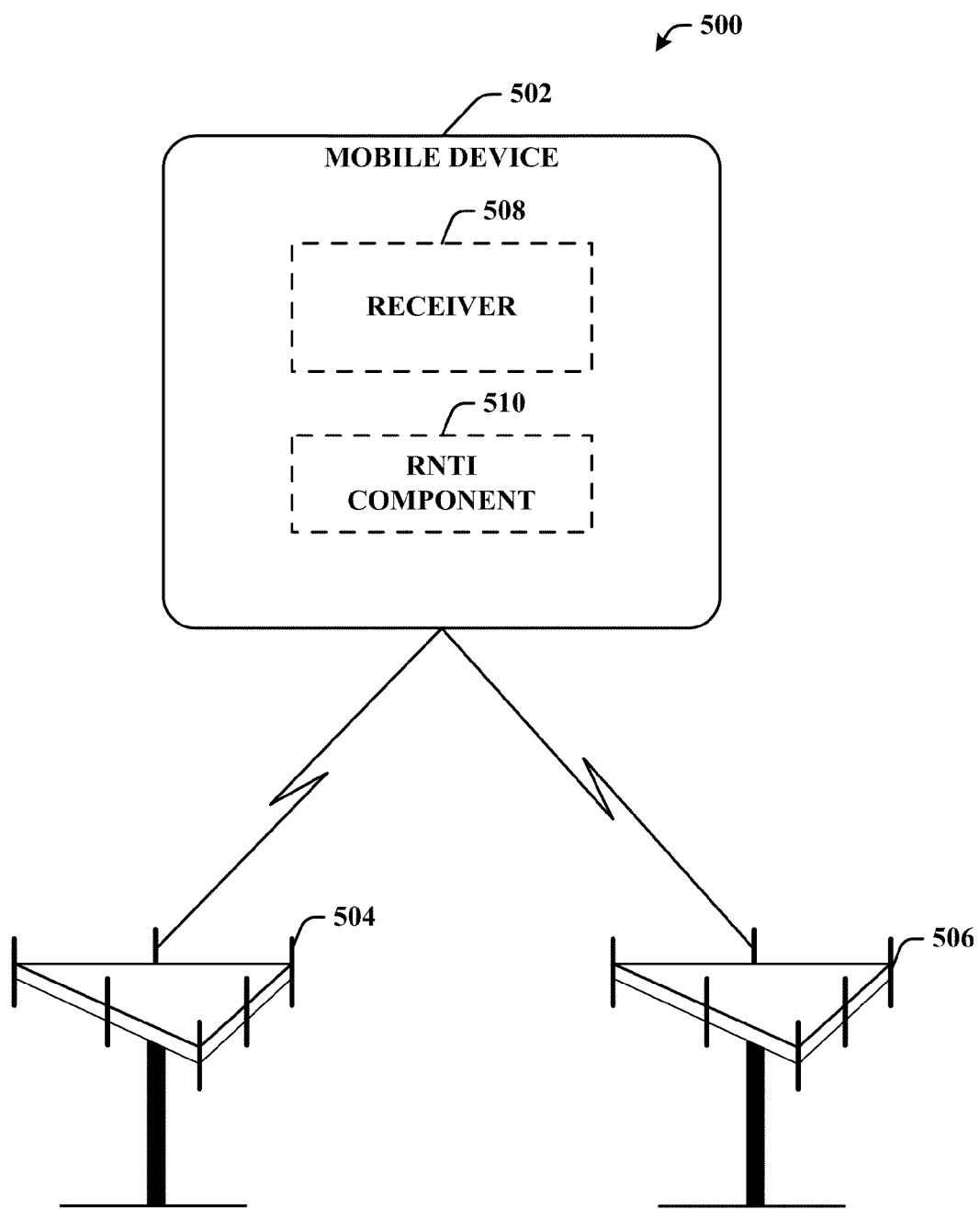
FIG. 5 illustrates an exemplary wireless communication system in accordance with at least one embodiment of the subject specification.

FIG. 5 illustrates an example wireless communication system in accordance with an aspect of the subject innovation. The communication system 500 includes a UE 502 that is in communication with a serving base station 504 and a neighboring base station 506. The UE 502 includes a receiver 508 that is responsible for the mechanics of receiving downlink communications from the base stations 504 and 506.

In addition, the UE 510 includes an RNTI component 510, which is an example of a processing unit comprised in the UE 510. The processing unit can include, for example, a computer processor configured to execute computer-readable instructions and/or a computer-readable program recorded on a computer-readable recording medium of the UE 510. The RNTI component 510 can determine the identity of a UE that is the cause of interference for the UE 502, wherein the UE 502 can employ inter-cell interference cancellation upon discovering the identity of the interfering UE. For example, the RNTI component 510 can determine if the neighboring base station 506 is employing space splitting and/or implicit broadcasting (as discussed previously), and can take the necessary action based on the determination. For example, upon determining that the neighboring base station 506 is employing space splitting and/or implicit broadcasting, the UE 502 can determine an identity of an interfering UE being served by the neighboring base station 506 in accordance with the (i) allocated subset of RNTIs allocated to the interfering UE and/or (ii) the implicitly broadcast RNTI that was allocated to the interfering UE. The UE 502 can then, in turn, transmit notification of the interference and the identity of the interfering UE to the neighboring base station 506, which can then take corrective measures such as adjusting the control channel of the interfering UE, for example.

Figure 6:
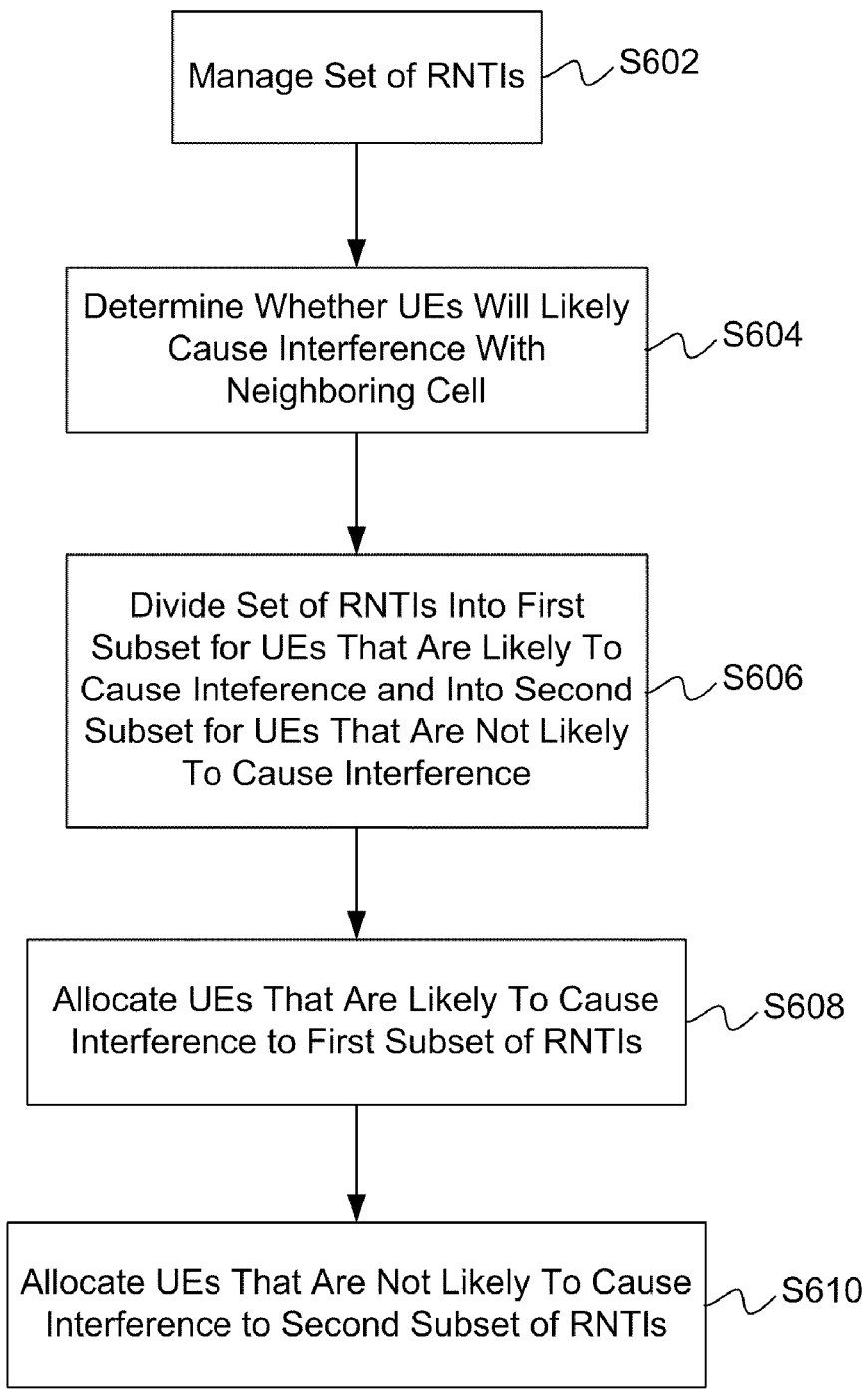
FIG. 6 illustrates a flowchart illustrating exemplary features of a method of facilitating inter-cell interference cancellation in accordance with at least one embodiment of the subject specification.

FIG. 6 illustrates an exemplary method of facilitating inter-cell interference cancellation in a wireless network, according to at least one embodiment of the present disclosure. In step S602, a terminal of the wireless network, such as the base station 402 illustrated in FIG. 4, for example, manages a set of RNTIs for a set of UE (e.g., UEs 404 illustrated in FIG. 4) being served by the terminal in the wireless network. In step S604, the terminal determines whether the UEs will likely cause interference with at least one neighboring cell, based on at least one respective attribute of the UEs, in accordance with the exemplary techniques described above. Based on the determination in step S604, the terminal divides the set of RNTIs into at least one first subset (e.g., subset A) for the UEs that are determined to likely cause interference, and into at least one second subset (e.g., subset B) for the UEs that are not determined to likely cause interference. In step S608, the terminal allocates the UEs that are determined to likely cause interference to the at least one first subset of the RNTIs such that the UEs that are determined to likely cause interference are respectively allocated a corresponding one of the RNTIs among the at least one first subset of RNTIs. In step S609, the terminal allocates the UEs that are not determined to likely cause interference to the at least one second subset of the RNTIs such that the UEs that are not determined to likely cause interference are respectively allocated a corresponding one of the RNTIs among the at least one second subset of RNTIs. For clarity of illustration, steps S608 and S609 are illustrated as different steps. However, steps S608 and S609 can be performed at the same time, or steps S608 and S609 can be performed in any sequential order.

Figure 7:
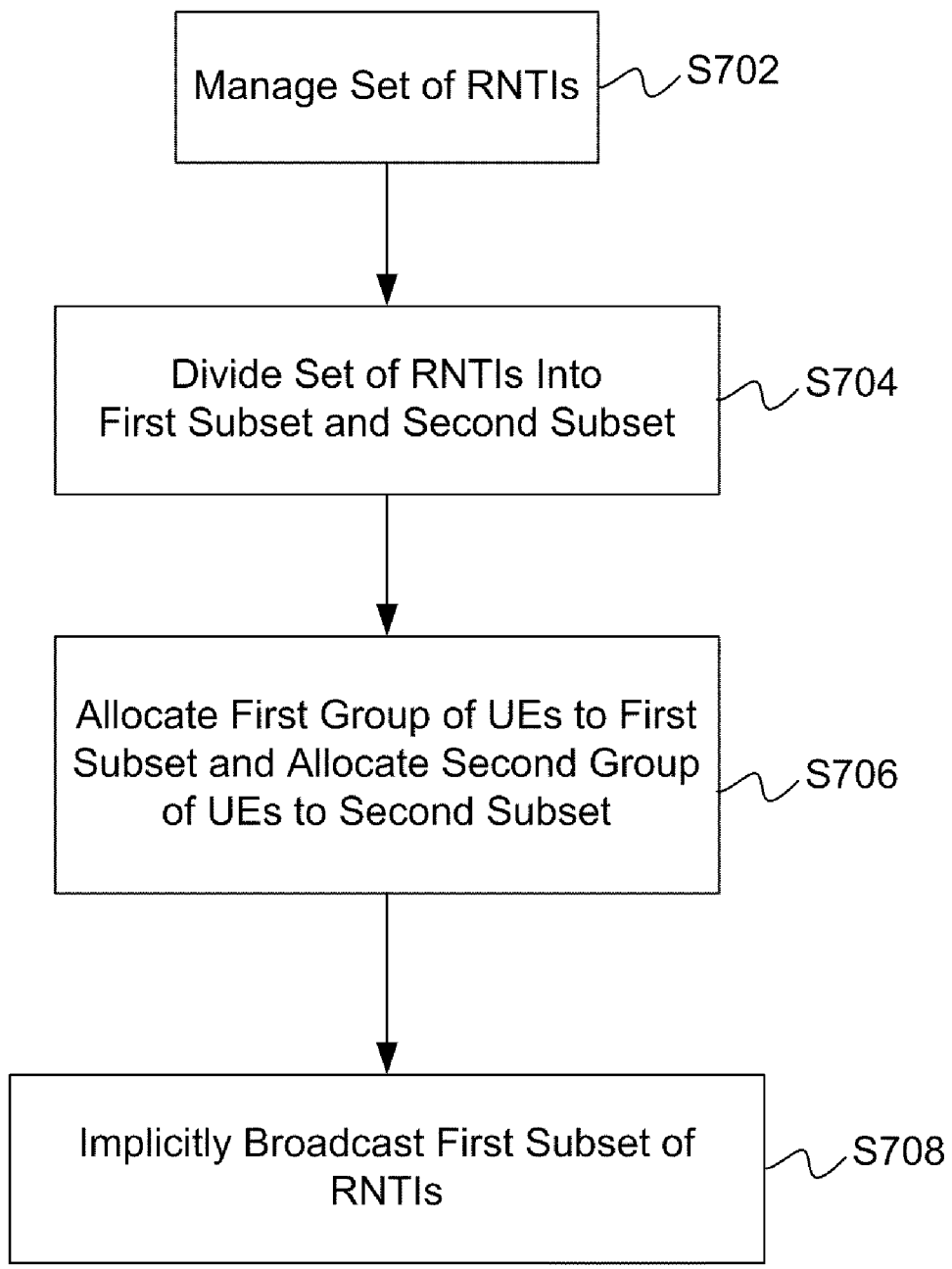
FIG. 7 illustrates a flowchart illustrating exemplary features of a method of facilitating inter-cell interference cancellation in accordance with at least one embodiment of the subject specification.

FIG. 7 illustrates another exemplary method of facilitating inter-cell interference cancellation in a wireless network, according to at least one embodiment of the present disclosure. In step S702, a terminal of the wireless network, such as the base station 402 illustrated in FIG. 4, for example, manages a set of RNTIs for a set of UE (e.g., UEs 404 illustrated in FIG. 4) being served by the terminal in the wireless network. In step S704, the terminal divides the set of RNTIs into at least two subsets (e.g., subset A and subset B). In step S706, the terminal allocates a first group of the UEs to a first subset among the plurality of divided subsets, based on at least one criterion, such that UEs in the first group of the UEs are respectively allocated a corresponding one of the RNTIs among the first subset of RNTIs. For example, first group of UEs can include the UEs that are determined to likely cause interference with a neighboring cell. According to an exemplary embodiment, each allocated RNTI among the first subset of RNTIs is comprised of a first component uniquely identifying the first subset of RNTIs, and a second component uniquely identifying a corresponding one of the first group of UEs to which each RNTI of the first subset of RNTIs is respectively allocated. In step S708, the terminal implicitly broadcasts the first subset of RNTIs by broadcasting the first component of the RNTIs allocated among the first subset of RNTIs, in accordance with any of the exemplary techniques described above.

Figure 8:
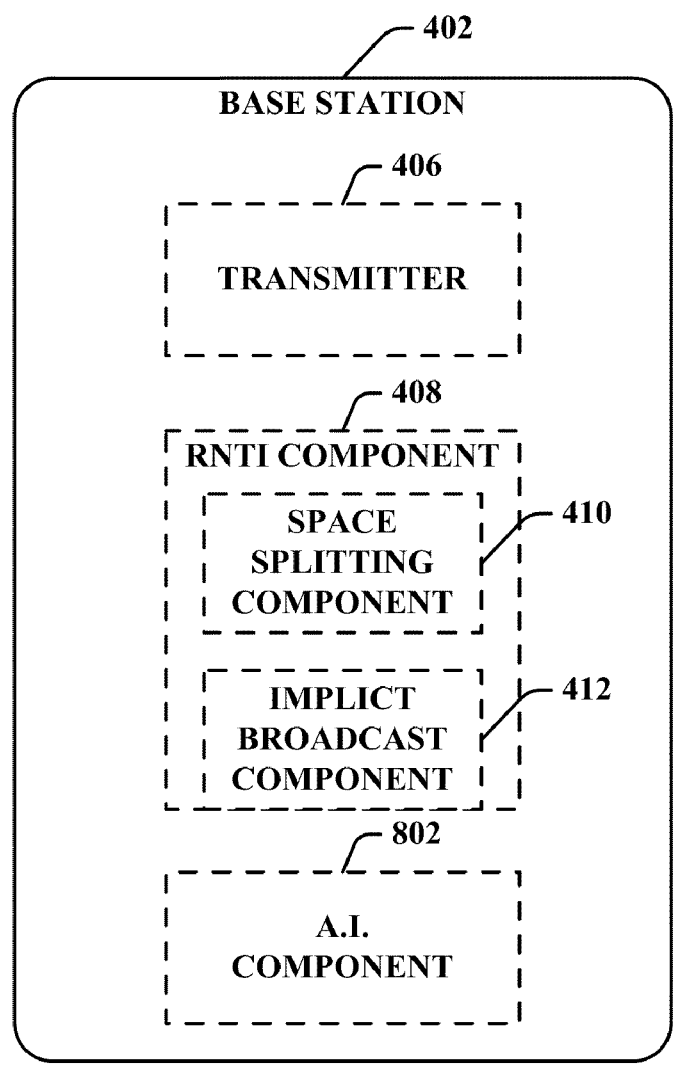
FIG. 8 illustrates an exemplary system that employs an artificial intelligence component, which facilitates automating one or more features in accordance with the subject specification.

FIG. 8 illustrates a base station 402, which in addition to the above components, employs an artificial intelligence (AI) component 602, which facilitates automating one or more features in accordance with an exemplary embodiment of the subject innovation. The subject innovation (e.g., in connection with inferring) can employ various AI-based schemes for carrying out various aspects thereof.

A classifier is a function that maps an input attribute vector, $x=(x_1, x_2, x_3, x_4, x_n)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject method can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed, and at what time of day to implement tighter criteria controls (e.g., in the evening when system performance would be less impacted).

The various illustrative logics, logical blocks, modules, circuits and method steps described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

In addition, as described above, exemplary embodiments of the present disclosure also provide a method of facilitating inter-cell cancellation in a wireless network. The exemplary methods of the present disclosure can perform various operative functions of the structural components illustrated in connection with the exemplary systems described above. For example, exemplary embodiments of the present disclosure provide a method of facilitating inter-cell interference cancellation, in which the method comprises operative steps corresponding to the above-described features of the wireless communication systems 100, 200, 300, 400 and 500 illustrated in FIGS. 1-5, as well as the functions of the base station 402 illustrated in FIG. 6.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of facilitating inter-cell interference mitigation in a wireless network, comprising:
   managing, in a node of the wireless network, a set of RNTIs (radio network temporary identifiers) for a set of user equipment (UE) being served by the node in the wireless network;
   determining, in the node, whether the UEs will likely cause interference with at least one neighboring cell, based on at least one respective attribute of the UEs;
   dividing, in the node, the set of RNTIs into at least one first subset for the UEs that are determined to likely cause interference, and into at least one second subset for the UEs that are not determined to likely cause interference; and
   allocating, in the node, the UEs that are determined to likely cause interference to the at least one first subset of the RNTIs such that UEs that are determined to likely cause interference are respectively allocated a corresponding one of the RNTIs among the at least one first subset of RNTIs,
   wherein each allocated RNTI uniquely identifies a corresponding one of the UEs.

2. The method of claim 1, further comprising communicating the allocated RNTIs to at least one UE being served in the at least one neighboring cell.

3. The method of claim 2, wherein the node serving the UEs that are determined to likely cause interference with the at least one neighboring cell communicates the allocated RNTIs to the at least one neighboring cell, and the at least one neighboring cell broadcasts the allocated RNTIs to at least one UE being served in the at least one neighboring cell and experiencing interference from transmission to at least one of the UEs allocated a corresponding one of the plurality of RNTIs.

4. The method of claim 1, wherein the node serving the UEs that are determined to likely cause interference with the at least one neighboring cell communicates the allocated RNTIs to the at least one neighboring cell.

5. The method of claim 1, further comprising:
   managing, in the node, a plurality of sets of RNTIs respectively corresponding to a plurality of RNTIs selected from the group consisting of cell RNTIs (C-RNTIs), semi-persistent scheduling RNTIs (SRS-RNTIs), temporary cell RNTIs (T-RNTIs), system information RNTIs (S-RNTIs), paging RNTIs (P-RNTIs) and random access RNTIs (RA-RNTI),
   dividing, in the node, the plurality of sets of RNTIs into at least one first subset for the UEs that are determined to likely cause interference, and into at least one second subset for the UEs that are not determined to likely cause interference; and
   allocating, in the node, the UEs that are determined to likely cause interference to the at least one subset of the RNTIs such that UEs that are determined to likely cause interference are respectively allocated a corresponding one of the plurality of RNTIs among the at least one first subset of RNTIs.

6. The method of claim 5, wherein the node divides the plurality of sets of RNTIs into respectively different subsets for each one of the plurality of sets of RNTIs.

7. The method of claim 1, wherein each allocated RNTI is comprised of a first component uniquely identifying the at least one first subset of RNTIs, and a second component uniquely identifying a corresponding one of the UEs to which each RNTI is respectively allocated, and
   wherein the method further comprises implicitly broadcasting the at least one first subset of RNTIs by broadcasting the first component of the RNTIs allocated among the at least one first subset of RNTIs.

8. The method of claim 7, wherein each RNTI is comprised of sixteen bits, and
   wherein the first component of each RNTI is constituted by the first twelve bits of the sixteen bits, and the second component of each RNTI is constituted by four bits succeeding the first twelve bits of the first component, the four bits of the second component uniquely identifying a corresponding one of the UEs to which each RNTI is respectively allocated.

9. The method of claim 7, wherein the at least one first subset of RNTIs is broadcast via one of a physical downlink control channel (PDCCH) and a physical downlink shared channel (PDSCH).

10. The method of claim 7, comprising dynamically modifying a number of bits comprised in the first component of the RNTI and a number of bits comprised in the second component of the RNTI to accommodate changes in operating conditions of a cell in which the terminal is located.

11. The method of claim 1, further comprising allocating, in the node, the UEs that are not determined to likely cause interference to the at least one second subset of the RNTIs such that UEs that are not determined to likely cause interference are respectively allocated a corresponding one of the RNTIs among the at least one second subset of RNTIs.

12. The method of claim 1, wherein the at least one first subset of RNTIs represent inter-cell interference cancellation related RNTIs, and the at least one second subset of RNTIs represent non-inter-cell interference related RNTIs.

13. The method of claim 1, wherein the at least one respective attribute of the UEs comprises at least one of a respective proximity of the UEs to the node, a respective proximity of the UEs to an edge of a cell being served by the node, and a respective activity state of the UEs.

14. The method of claim 13, wherein the node determines that the UEs will likely cause interference with the at least one neighboring cell when the UEs are respectively in closer proximity to the edge of the cell than to the node.

15. The method of claim 13, wherein the node determines that the UEs will not likely cause interference with the at least one neighboring cell when the UEs are presently in an inactive state.

16. The method of claim 1, further comprising broadcasting the allocated RNTIs to the corresponding one of the UEs to which the RNTIs among the at least one first subset of RNTIs are respectively allocated via one of a physical downlink control channel (PDCCH) and a physical downlink shared channel (PDSCH).

17. The method of claim 1, further comprising scanning, in a UE being served by the at least one neighboring cell, the at least one first subset of the RNTIs to determine an interfering UE among the UEs to which a corresponding one of the at least one first subset of RNTIs is respectively allocated.

18. The method of claim 1, further comprising broadcasting each one of the allocated RNTIs among the at least one first subset of RNTIs to the corresponding one of the UEs to which the RNTIs of the at least one first subset of RNTIs are respectively allocated, to inform the corresponding one of the UEs that downlink is intended for the corresponding one of the UEs.

19. The method of claim 1, wherein each one of the allocated RNTIs among the at least one first subset of RNTIs constitutes a control channel for the corresponding one of the UEs to which the RNTIs of the at least one first subset of RNTIs are respectively allocated, and
wherein content in the control channel for the corresponding one of the UEs is scrambled in the RNTI allocated to the corresponding one of the UEs.

20. A non-transitory computer-readable recording medium having a computer program recorded thereon that causes a computing device of the node to perform the method of claim 1.

21. A method of facilitating inter-cell interference mitigation in a wireless network, comprising:

managing, in a node of the wireless network, a set of RNTIs (radio network temporary identifiers) for a set of UE (user equipment) being served by the node in the wireless network;
dividing, in the node, the set of RNTIs into a plurality of subsets;
allocating, in the node, a first group of the UEs to a first subset among the plurality of divided subsets, based on at least one criterion, such that UEs in the first group of the UEs are respectively allocated a corresponding one of the RNTIs among the first subset of RNTIs, wherein each allocated RNTI among the first subset of RNTIs is comprised of a first component uniquely identifying the first subset of RNTIs, and a second component uniquely identifying a corresponding one of the first group of UEs to which each RNTI of the first subset of RNTIs is respectively allocated; and
implicitly broadcasting the first subset of RNTIs by broadcasting the first component of the RNTIs allocated among the first subset of RNTIs; wherein the at least one criterion comprises whether the UEs being served by the node will likely cause interference with at least one neighboring cell.

22. The method of claim 21, wherein the node determines whether the UEs will likely cause interference with the at least one neighboring cell, based on at least one respective attribute of the UEs,
wherein the at least one respective attribute of the UEs comprises at least one of a respective proximity of the UEs to the node, a respective proximity of the UEs to an edge of a cell being served by the node, and a respective activity state of the UEs.

23. The method of claim 22, wherein the node determines that the UEs will likely cause interference with the at least one neighboring cell when the UEs are respectively in closer proximity to the edge of the cell than to the node.

24. The method of claim 22, wherein the node determines that the UEs will not likely cause interference with the at least one neighboring cell when the UEs are presently in an inactive state.

25. The method of claim 21, further comprising scanning, in a UE being served by the at least one neighboring cell, the first subset of RNTIs allocated to the first group of UEs to determine an interfering UE among the UEs of the first group of UEs to which a corresponding one of the first subset of RNTIs is respectively allocated.

26. The method of claim 21, further comprising:
determining whether the UEs will likely cause interference with the at least one neighboring cell; and
allocating a second group of the UEs to a second one of the subsets of RNTIs such that UEs in the second group of the UEs are respectively allocated a corresponding one of the RNTIs among the second subset of RNTIs,
wherein the second group of the UEs comprises the UEs which are not determined to likely cause interference with the at least one neighboring cell.

27. The method of claim 26, wherein the first subset of RNTIs represent inter-cell interference cancellation related RNTIs, and the second subset of RNTIs represent non-inter-cell interference related RNTIs.

28. The method of claim 21, wherein the allocating of the first group of UEs to the at least one first subset of RNTIs comprises broadcasting the allocated RNTIs to the corresponding one of the UEs of the first group of UEs to which the RNTIs among the first subset are respectively allocated via one of a physical downlink control channel (PDCCH) and a physical downlink shared channel (PDSCH).

29. The method of claim 21, wherein each one of the allocated RNTIs among the first subset of RNTIs is broadcast to the corresponding one of the first group of UEs to which the RNTIs of the first subset of RNTIs are respectively allocated, to inform the corresponding one of the UEs that downlink is intended for the corresponding one of the UEs.

30. The method of claim 21, wherein each one of the allocated RNTIs among the first subset of RNTIs constitutes a control channel for the corresponding one of the first group of UEs to which the RNTIs of the first subset of RNTIs are respectively allocated, and
wherein content in the control channel for the corresponding one of the UEs is scrambled in the RNTI allocated to the corresponding one of the UEs.

31. The method of claim 21, wherein each allocated RNTI is comprised of sixteen bits, and
wherein the first component of each RNTI is constituted by the first twelve bits of the sixteen bits, and the second component of each RNTI is constituted by four bits succeeding the first twelve bits of the first component.

32. A non-transitory computer-readable recording medium having a computer program recorded thereon that causes a computing device of the node to execute the method of claim 21.

33. A computer processing device having at least one processor configured to facilitate inter-cell interference mitigation, the at least one processor comprising:
a first module configured to manage a set of RNTIs (radio network temporary identifiers) for a plurality of UE (user equipment) being served by a node in a wireless network;
a second module configured to determine whether the UEs will likely cause interference with at least one of neighboring cell, based on at least one respective attribute of the UEs;
a third module configured to divide the set of RNTIs into at least one first subset for the UEs that are determined to likely cause interference, and into at least one second subset for the UEs that are not determined to likely cause interference; and
a fourth module configured to allocate the UEs that are determined to likely cause interference to the at least one first subset of the RNTIs such that UEs that are determined to likely cause interference are respectively allocated a corresponding one of the RNTIs among the at least one first subset of RNTIs,
wherein each allocated RNTI uniquely identifies a corresponding one of the UEs.

34. The computer processing device of claim 33, wherein the processor further comprises a fifth module configured to cause the node to broadcast the allocated RNTIs to the corresponding one of the UEs to which the RNTIs among the at least one first subset of RNTIs are respectively allocated via one of a physical downlink control channel (PDCCH) and a physical downlink shared channel (PDSCH).

35. The computer processing device of claim 34, wherein the fifth module is configured to cause the node to broadcast each one of the allocated RNTIs among the at least one first subset of RNTIs to the corresponding one of the UEs to which the RNTIs of the at least one first subset of RNTIs are respectively allocated, to inform the corresponding one of the UEs that downlink is intended for the corresponding one of the UEs.

36. The computer processing device of claim 33, wherein the processor further comprises a fifth module configured to cause the node to communicate the allocated RNTIs of the at least one subset of RNTIs to at least one of another terminal serving the at least one neighboring cell, and to at least one UE being served in the at least one neighboring cell, to enable the at least one UE being served in the at least one neighboring cell to scan the first subset of the RNTIs to determine an interfering UE among the UEs to which a corresponding one of the at least one first subset of RNTIs is respectively allocated.

37. The computer processing device of claim 33, wherein the fourth module is configured to allocate the UEs that are not determined to likely cause interference to the at least one second subset of the RNTIs such that UEs that are not determined to likely cause interference are respectively allocated a corresponding one of the RNTIs among the at least one second subset of RNTIs.

38. The computer processing device of claim 33, wherein each allocated RNTI is comprised of a first component identifying the at least one first subset of RNTIs, and a second component uniquely identifying a corresponding one of the UEs to which each RNTI is respectively allocated, and
wherein the processor further comprises a fifth module configured to cause the node to implicitly broadcast the at least one first subset of RNTIs by broadcasting the first component of the RNTIs allocated among the at least one first subset of RNTIs.

39. The computer processing device of claim 38, wherein the fifth module is configured to cause the node to implicitly broadcast the at least one first subset of RNTIs via one of a physical downlink control channel (PDCCH) and a physical downlink shared channel (PDSCH).

40. The computer processing device of claim 33, wherein the at least one first subset of RNTIs represent inter-cell interference cancellation related RNTIs, and the at least one second subset of RNTIs represent non-inter-cell interference related RNTIs.

41. The computer processing device of claim 33, wherein the at least one respective attribute of the UEs comprise at least one of a respective proximity of the UEs to the node, a respective proximity of the UEs to an edge of a cell being served by the node, and a respective activity state of the UEs.

42. The computer processing device of claim 41, wherein the second module is configured to determine that the UEs will likely cause interference with the at least one neighboring cell when the UEs are respectively in closer proximity to the edge of the cell than to the node.

43. An apparatus, comprising:
means for managing a set of RNTIs (remote network temporary identifiers) for a set of UE (user equipment) being served by a node in a wireless network;
means for determining whether the UEs will likely cause interference with at least one of neighboring cell, based on at least one respective attribute of the UEs;
means for dividing the set of RNTIs into at least one first subset for the UEs that are determined to likely cause interference, and into at least one second subset for the UEs that not determined to likely cause interference; and
means for allocating the UEs that are determined to likely cause interference to the at least one first subset of the RNTIs such that UEs that are determined to likely cause interference are respectively allocated a corresponding one of the RNTIs among the at least one first subset of RNTIs,
wherein each allocated RNTI uniquely identifies a corresponding one of the UEs to which the RNTIs are respectively allocated.

44. The apparatus of claim 43, further comprising means for broadcasting the allocated RNTIs to the corresponding one of the UEs to which the RNTIs among the at least one first subset of RNTIs are respectively allocated via one of a physical downlink control channel (PDCCH) and a physical downlink shared channel (PDSCH).

45. The apparatus of claim 44, wherein the broadcasting means broadcasts each one of the allocated RNTIs among the at least one first subset of RNTIs to the corresponding one of the UEs to which the RNTIs of the at least one first subset of RNTIs are respectively allocated, to inform the corresponding one of the UEs that downlink is intended for the corresponding one of the UEs.

46. The apparatus of claim 43, further comprising means for communicating the allocated RNTIs of the at least one subset of RNTIs to at least one of another node serving the at least one neighboring cell, and to at least one UE being served in the at least one neighboring cell, to enable the at least one UE being served in the at least one neighboring cell to scan the first subset of the RNTIs to determine an interfering UE among the UEs to which a corresponding one of the at least one first subset of RNTIs is respectively allocated.

47. The apparatus of claim 43, wherein the allocating means allocates the UEs that are not determined to likely cause interference to the at least one second subset of the RNTIs such that UEs that are not determined to likely cause interference are respectively allocated a corresponding one of the RNTIs among the at least one second subset of RNTIs.

48. The apparatus of claim 43, wherein each allocated RNTI is comprised of a first component identifying the at least one first subset of RNTIs, and a second component uniquely identifying a corresponding one of the UEs to which each RNTI is respectively allocated, and
wherein the apparatus further comprises means for implicitly broadcasting the at least one first subset of RNTIs by broadcasting the first component of the RNTIs allocated among the at least one first subset of RNTIs.

49. The apparatus of claim 48, wherein the implicit broadcasting means implicitly broadcasts the at least one first subset of RNTIs via one of a physical downlink control channel (PDCCH) and a physical downlink shared channel (PDSCH).

50. The apparatus of claim 43, wherein the at least one first subset of RNTIs represent inter-cell interference cancellation related RNTIs, and the at least one second subset of RNTIs represent non-inter-cell interference related RNTIs.

51. The apparatus of claim 43, wherein the at least one respective attribute of the UEs comprise at least one of a respective proximity of the UEs to the node, a respective proximity of the UEs to an edge of a cell being served by the node, and a respective activity state of the UEs.

52. The apparatus of claim 51, wherein the determining means determines that the UEs will likely cause interference with the at least one neighboring cell when the UEs are respectively in closer proximity to the edge of the cell than to the node.

53. An apparatus, comprising: a transmitter configured to broadcast content to a plurality of user equipment (UE) in a wireless network, the content transmitted from the transmitter containing an RNTI that is respectively unique to the UE to which the content is transmitted; and a RNTI component that includes a space splitting component and an implicit broadcast component, wherein the space splitting component is configured to maintain a set of RNTIs for the plurality of UEs, divide the set of RNTIs into a plurality of subsets based on at least one respective attribute of the plurality of UEs, allocate a first group of the plurality of UEs to a first subset of the divided RNTIs, based on the respective attribute of the UEs in the first group of UEs, such that UEs in the first group of UEs are respectively allocated a corresponding one of the RNTIs among the first subset of RNTIs, each allocated RNTI among the first subset of RNTIs comprising a first component uniquely identifying the first subset of RNTIs, and a second component uniquely identifying a corresponding one of the first group of UEs to which each RNTI of the first subset of RNTIs is respectively allocated, and wherein the implicit broadcast component is configured to cause the transmitter to broadcast the first subset of RNTIs implicitly by broadcasting the first component of the RNTIs allocated among the first subset of RNTIs; wherein the at least one attribute comprises whether the UEs will at least one of likely cause interference with at least one neighboring cell.

54. The apparatus of claim 53, wherein the space splitting component is further configured to cause the transmitter to broadcast the allocated RNTIs to the corresponding one of the UEs to which the RNTIs among the first subset of RNTIs are respectively allocated via one of a physical downlink control channel (PDCCH) and a physical downlink shared channel (PDSCH).

55. The apparatus of claim 53, wherein:
the RNTI component is configured to determine whether the UEs will likely cause interference with at least one neighboring cell;
the space splitting component is further configured to allocate a second group of the UEs to a second one of the subsets of RNTIs such that UEs in the second group of the UEs are respectively allocated a corresponding one of the RNTIs among the second subset of RNTIs; and
the second group of the UEs comprising the UEs that are not determined to likely cause interference.

56. The apparatus of claim 55, wherein the first subset of RNTIs represent inter-cell interference cancellation related RNTIs, and the second subset of RNTIs represent non-inter-cell interference related RNTIs.

57. The apparatus of claim 53, wherein the space splitting component is further configured to cause the transmitter to communicate the allocated RNTIs of the at least one subset of RNTIs to at least one of a node serving at least one neighboring cell, and to at least one UE being served in the at least one neighboring cell, to enable the at least one UE being served in the at least one neighboring cell to scan the first subset of the RNTIs to determine an interfering UE among the UEs to which a corresponding one of the first subset of RNTIs is respectively allocated.

58. The apparatus of claim 53, wherein the implicit broadcast component is configured to cause the transmitter to implicitly broadcast the first subset of RNTIs to at least one of a node serving at least one neighboring cell, and to at least one UE being served in the at least one neighboring cell, to enable the at least one UE being served in the at least one neighboring cell to determine an interfering UE among the UEs to which a corresponding one of the first subset of RNTIs is respectively allocated, based on the first component contained in the implicitly broadcast first subset of RNTIs.

59. The apparatus of claim 53, wherein the RNTI component is configured to determine whether the UEs will likely cause interference with the at least one neighboring cell, and
wherein the space slitting component is configured to:
maintain a plurality of sets of RNTIs respectively corresponding to a plurality of RNTIs selected from the group consisting of cell RNTIs (C-RNTIs), semi-persistent scheduling RNTIs (SRS-RNTIs), temporary cell RNTIs (T-RNTIs), system information RNTIs (S-RNTIs), paging RNTIs (P-RNTIs) and random access RNTIs (RA-RNTI),
divide the plurality of sets of RNTIs into at least one first subset for the UEs that are determined to likely cause interference, and into at least one second subset for the UEs that are not determined to likely cause interference; and allocate the UEs that are determined to likely cause interference to the at least one subset of the RNTIs such that UEs that are determined to likely cause interference are respectively allocated a corresponding one of the plurality of RNTIs among the at least one first subset of RNTIs.

60. The apparatus of claim 59, wherein the space splitting component is configured to divide the plurality of sets of RNTIs into respectively different subsets for each one of the plurality of sets of RNTIs.

61. A user equipment (UE) configured to be served by a node in a wireless network, the UE comprising: a reception unit configured to receive an RNTI (radio network temporary identifier) allocated to the UE to uniquely identify the UE in a cell served by the terminal, to receive content from the node, and to receive a subset of RNTIs respectively allocated to UEs in at least one neighboring cell that are likely to cause interference with the UE in the cell served by the node;

a processing unit configured to scan the received subset of RNTIs allocated to the UEs in the at least one neighboring cell to determine at least one interfering UE among the UEs in the at least one neighboring cell that is causing interference with the UE in the cell served by the node and that has been allocated a corresponding one of the received subset of RNTIs; and a transmission unit configured to transmit an interference notification signal including an identity of the determined UE to at least one of the node and another node serving the at least one neighboring cell to initiate at least one of mitigation and cancellation of the interference caused by the determined UE.

62. The UE of claim 61, wherein:

the RNTIs in the subset of RNTIs allocated to the UEs in the at least one neighboring cell each comprise a first component uniquely identifying the subset of RNTIs allocated to the UEs in the at least one neighboring cell, and a second component uniquely identifying a corresponding one of the UEs in the at least one neighboring cell to which each RNTI of the subset of RNTIs is respectively allocated;

the reception unit is configured to receive the first component of the subset of RNTIs; and the processing unit is configured to scan the RNTIs comprised in the received subset of RNTIs to determine the respective second component of the RNTIs allocated to a corresponding one of the UEs in the at least one neighboring cell based on the first component of the RNTIs, and to determine the at least one interfering UE in the at least one neighboring cell based on the determined respective second component of the RNTIs allocated to the UEs in the at least one neighboring cell.

* * * * *